(12) United States Patent
Izu et al.

(10) Patent No.: US 9,203,800 B2
(45) Date of Patent: Dec. 1, 2015

(54) COMMUNICATION METHOD, NODE, AND NETWORK SYSTEM

(71) Applicant: FUJITSU LIMITED, Kawasaki-shi, Kanagawa (JP)

(72) Inventors: Tetsuya Izu, Ichikawa (JP); Masahiko Takenaka, Kawasaki (JP); Kazuyoshi Furukawa, Kawasaki (JP); Hisashi Kojima, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 13/952,730

(22) Filed: Jul. 29, 2013

(65) Prior Publication Data

US 2013/0312082 A1 Nov. 21, 2013

Related U.S. Application Data

(63) Continuation of application No. PCT/JP2011/051965, filed on Jan. 31, 2011.

(51) Int. Cl.
*H04L 9/00* (2006.01)
*H04L 29/06* (2006.01)
*H04L 9/08* (2006.01)

(52) U.S. Cl.
CPC .............. *H04L 63/02* (2013.01); *H04L 9/0891* (2013.01); *H04L 63/126* (2013.01); *H04L 63/1458* (2013.01); *H04L 2209/80* (2013.01)

(58) Field of Classification Search
CPC .................................. H04L 9/00; H04L 45/20
USPC ........ 713/168–174; 380/44–47; 709/225–229
See application file for complete search history.

(56) References Cited

U.S. PATENT DOCUMENTS 7,933,280 B2 * 4/2011 Nagata ........................ 370/401
8,605,591 B2 * 12/2013 Shaffer et al. ................. 370/235
(Continued)

FOREIGN PATENT DOCUMENTS

JP 2003-283489 10/2003
JP 2003-348072 12/2003
(Continued)

OTHER PUBLICATIONS

English-language translations of International Preliminary Report on Patentability, and, Written Opinion, mailed Aug. 15, 2013, by the International Bureau, in connection with International Patent Application No. PCT/JP2011/051965.

(Continued)

*Primary Examiner* — Josnel Jeudy
(74) *Attorney, Agent, or Firm* — Fujitsu Patent Center

(57) ABSTRACT

A communication method executed by a node in an ad hoc network having multiple nodes, includes receiving from a neighboring node of the node in the ad hoc network, a first packet that includes a sender address of the neighboring node and a first packet transmission count of packet transmissions from the neighboring node; extracting the first packet transmission count from the first packet; receiving from the neighboring node and after reception of the first packet, a second packet that includes the sender address of the neighboring node and a second packet transmission count of packet transmissions from the neighboring node; extracting the second packet transmission count from the second packet; determining whether the second packet is an invalid packet, based on the first packet transmission count and the second packet transmission count; and discarding the second packet upon determining the second packet to be an invalid packet.

9 Claims, 18 Drawing Sheets

(56) References Cited

U.S. PATENT DOCUMENTS

| | | |
|---|---|---|
| 2004/0259529 A1 | 12/2004 | Suzuki |
| 2005/0091367 A1* | 4/2005 | Pyhalammi et al. .......... 709/224 |
| 2006/0291650 A1* | 12/2006 | Ananth ........................... 380/46 |
| 2007/0064950 A1 | 3/2007 | Suzuki et al. |
| 2007/0101142 A1 | 5/2007 | Suzuki |
| 2008/0133711 A1* | 6/2008 | Holt ............................... 709/218 |
| 2008/0140863 A1* | 6/2008 | Holt ............................... 709/249 |
| 2008/0247355 A1* | 10/2008 | Ahn ................................ 370/328 |
| 2009/0265141 A1* | 10/2009 | Aly et al. |
| 2011/0066856 A1 | 3/2011 | Yao et al. |
| 2011/0176681 A1 | 7/2011 | Yamada et al. |
| 2011/0188654 A1 | 8/2011 | Yao et al. |
| 2012/0236866 A1* | 9/2012 | Endo et al. .................... 370/392 |
| 2013/0315078 A1* | 11/2013 | Brown; Thomas A. |

FOREIGN PATENT DOCUMENTS

| | | |
|---|---|---|
| JP | 2004-241865 | 8/2004 |
| JP | 2007-088799 | 4/2007 |
| JP | 2008-108230 A | 5/2008 |
| JP | 2009-081854 | 4/2009 |
| JP | 2010-098597 | 4/2010 |
| JP | 2011-66703 A | 3/2011 |
| JP | 2011-160210 A | 8/2011 |

OTHER PUBLICATIONS

Huang, Chin-Tser et al., "Convergence of IPsec in Presence of Resets", Proceedings of the 23rd International Conference on Distributed Computing Systems Workshops, 2003, IEEE, pp. 22-27, See Abstract, Section 3, May 19-22, 2003.

International Search Report, mailed in connection with PCT/JP2011/051965 and mailed Mar. 1, 2011.

Japanese Office Action mailed Aug. 26, 2014 for corresponding Japanese Patent Application No. 2012-555602, with Partial English Translation, 5 pages.

* cited by examiner

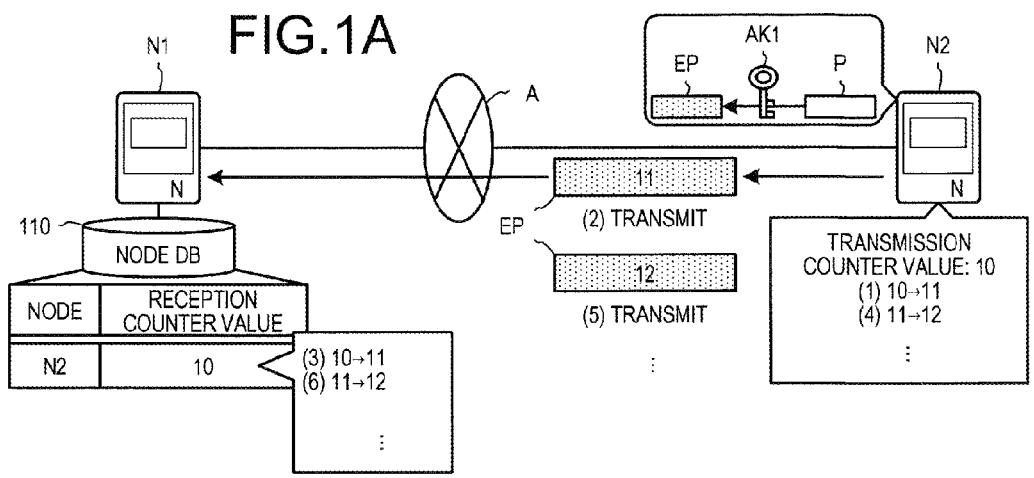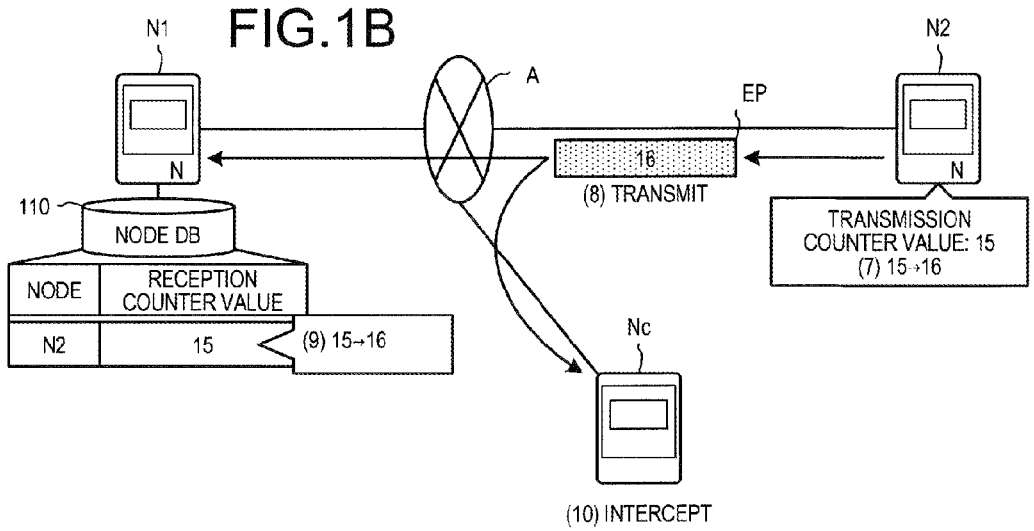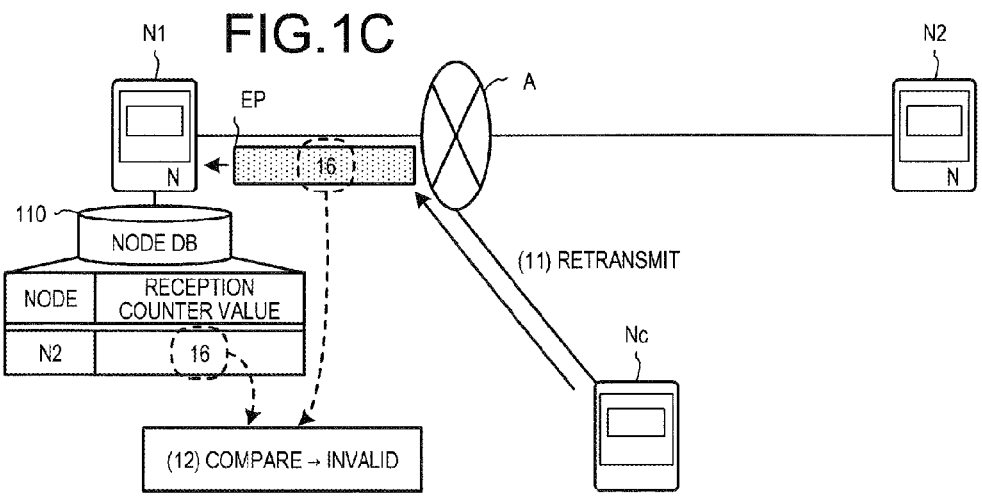

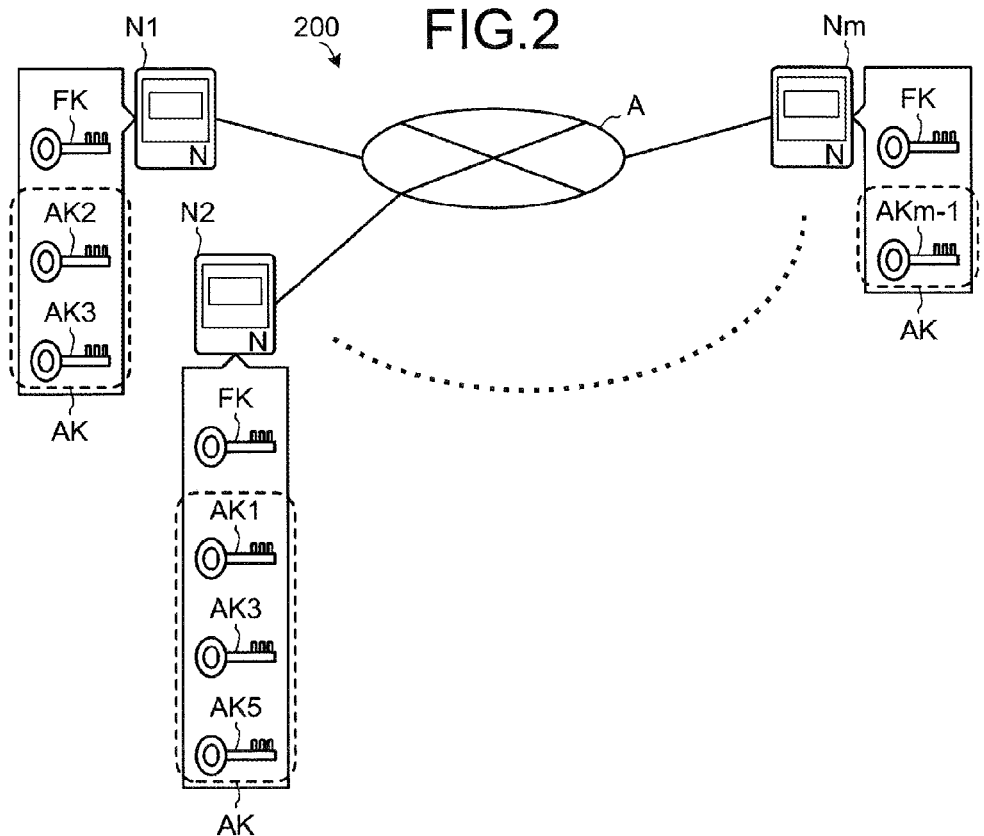
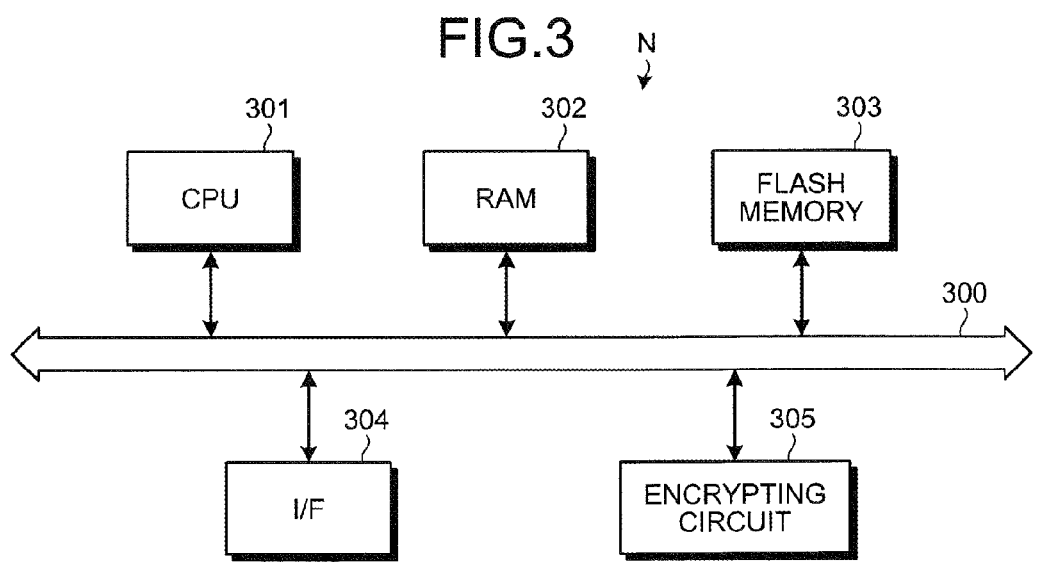

COMMUNICATION METHOD, NODE, AND NETWORK SYSTEM

CROSS REFERENCE TO RELATED APPLICATIONS

This application is a continuation application of International Application PCT/JP2011/051965, filed on Jan. 31, 2011 and designating the U.S., the entire contents of which are incorporated herein by reference.

FIELD

The embodiments discussed herein are related to a communication method, a node, and a network system that perform communication.

BACKGROUND

An ad hoc network is one type of a self-configurable network linked by radio communication. An ad hoc network is composed of plural nodes. The nodes in an ad hoc network transmit and receive packets via multi-hop communication. The multi-hop communication is a technique in which nodes not existing in mutual communication areas perform communications via different nodes existing in the respective communication areas.

One technique utilizing the ad hoc network is a system in which radio-communicable nodes are built in house power meters so that a service such as meter reading is performed via the ad hoc network without a worker actually going to the site. In the ad hoc network handling personal information such as household power consumption, secure communications are required to be performed from the viewpoint of privacy, tampering, etc. Thus, the conventional system ensures secure communications by encrypting packets transmitted and received between the nodes in the ad hoc network (see, for example, Japanese Laid-Open Patent Publication Nos. 2003-348072, 2010-98597, 2007-88799, and 2009-81854).

Even if packets are encrypted, a proper packet transmitted on the network in the past may be intercepted by an attacker in the ad hoc network, by which the attacker can resend the intercepted proper packet on the ad hoc network to launch an attack (resend attack) of congesting the network. Thus, to ensure network communication quality, the ad hoc network needs to provide against a resend attack.

In a conventional system, a node transmitting a packet, stores a packet transmission time into the packet. A technique exists in which a node receiving the packet compares the time therein with the transmission time indicated in the received packet and, if the two times are far apart, regards the packet as being a resend attack and discards the packet.

Nonetheless, with the conventional technologies above, the times of all nodes on the ad hoc network have to be synchronized. For example, a specific node in the ad hoc network or in a gateway serving as a relay device with another network broadcasts a time synchronizing packet periodically to thereby implement time synchronization among the nodes in the ad hoc network.

Accordingly, an ad hoc network performing meter reading transmits and receives the time synchronizing broadcast packet in addition to meter reading data packets, resulting in an increased communication load on the ad hoc network.

SUMMARY

According to an aspect of an embodiment, a communication method is executed by a node in an ad hoc network having multiple nodes. The communication method includes receiving from a neighboring node of the node in the ad hoc network, a first packet that includes a sender address of the neighboring node and a first packet transmission count of packet transmissions from the neighboring node; extracting the first packet transmission count from the first packet; receiving from the neighboring node and after reception of the first packet, a second packet that includes the sender address of the neighboring node and a second packet transmission count of packet transmissions from the neighboring node; extracting the second packet transmission count from the second packet; determining whether the second packet is an invalid packet, based on the first packet transmission count and the second packet transmission count; and discarding the second packet upon determining the second packet to be an invalid packet.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A, 1B, and 1C are diagrams of an example of a validity determination for a packet received by a node according to an embodiment;

FIG. 2 is an explanatory view of an example of a network system according to the embodiment;

FIG. 3 is a block diagram of a hardware configuration example of a node N according to the embodiment;

DESCRIPTION OF EMBODIMENTS

Figure 4:
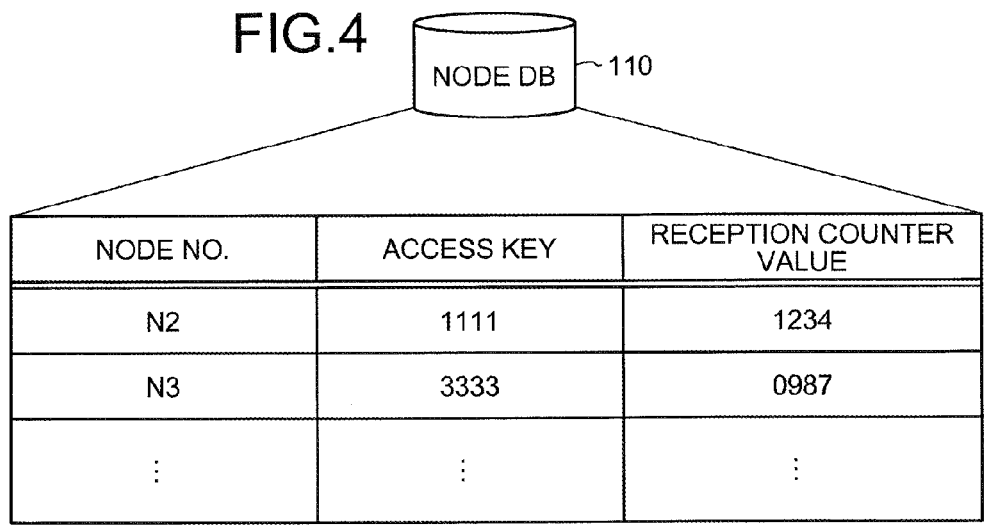
FIG. 4 is an explanatory view of an example of the contents of a node DB 110 depicted in FIGS. 1A, 1B, and 1C.

An embodiment of a communication method, a node, and a network system will be described in detail with reference to the accompanying drawings. In this embodiment, each node uses, instead of the time information, a counter value indicating the number of packet transmissions from the each node. If each node uses time information, it is necessary to establish synchronization with an absolute reference time via the network, resulting in an increased network communication load. On the other hand, if each node uses the counter value, the communication load on the network can be reduced since the counter value is a relative value that can be updated by processing in the each node alone.

FIGS. 1A, 1B, and 1C are diagrams of an example of a validity determination for a packet received by a node according to the present embodiment. In FIGS. 1A, 1B, and 1C, an ad hoc network A is composed of plural nodes (node N1 and N2). The nodes N1 and N2 are neighboring nodes present in respective communication areas and communicate encrypted packets EP that are encrypted from packets P. In this case, each node N performs the validity determination for each received encrypted packet EP and, if the encrypted packet EP is determined as being an invalid packet affected by a resend attack, the node N discards the encrypted packet EP to ensure communication quality.

Each node N retains a transmission counter value indicating the cumulative number of transmissions of the encrypted packets EP by the node N. The transmission counter value is incremented each time the node N transmits an encrypted packet EP. The node N further includes the resulting transmission counter value in the encrypted packet EP to be transmitted. Each node N further retains, as a reception counter value, in a node database (hereinafter, "node DB 110"), the transmission counter value included in the packet received by the node N, the transmission counter value (i.e., reception counter value) being correlated with the sender node of the received packet.

Thus, each node N can perform the validity determination for the received encrypted packet EP, based on the transmission counter value and the reception counter value retained in the node DB 110. For example, as long as the nodes N continue to receive a proper encrypted packet EP from a neighboring node, the transmission counter value in the received encrypted packet EP is greater than the transmission counter value (i.e. the reception counter value) in the encrypted packet EP received the last time.

On the other hand, in the case of a resend attack, an encrypted packet EP transmitted in the past is transmitted as is and consequently, the transmission counter value in the encrypted packet EP received by the node N is less than or equal to the transmission counter value (i.e. the reception counter value) in the encrypted packet EP received the last time. Thus, by comparing the transmission counter value and the reception counter value, the node N can identify an invalid packet consequent to a resend attack.

For example, with reference to FIGS. 1A, 1B, and 1C, the validity determination for a received encrypted packet EP will be described taking an example in which the node N2 transmits an encrypted packet EP and the node N1 receives the encrypted packet EP.

In this case, each node N transmits to other nodes, a common key (hereinafter, "access key") for use in the encryption of a packet P transmitted to the node. Each node N receiving the access key associates and retains the received access key with the sender node. When transmitting a packet P to the sender node, the node N uses the associated access key to encrypt the packet P into an encrypted packet EP for transmission. The access key associated with the sender node may be stored together with the reception counter value in the node DB 110.

For example, the node N1 transmits to the node N2, an access key AK1 used for the encryption of a packet P to be transmitted to the node N1. The node N2 retains the access key AK1 received from the node N1 and, when transmitting a packet P to the node N1, uses the access key AK1 to encrypt the packet P into an encrypted packet EP for transmission. On the other hand, the node N1 receiving the encrypted packet EP decrypts the encrypted packet EP using the access key AK1.

As depicted in FIG. 1A, (1) when transmitting an encrypted packet EP at an 11th transmission, the node N2 updates the transmission counter value stored in a storage device of the node N2 from "10" to "11". Then, (2) the node N2 transmits to the node N1, the encrypted packet EP that is encrypted from a packet P that is to be transmitted and includes the updated transmission counter value "11".

(3) The node N1 that receives the encrypted packet EP decrypts the encrypted packet EP and compares the transmission counter value "11" extracted from the decrypted packet P with the reception counter value "10" retained in the node DB 110 of the node N1. In this case, the node N1 has received an encrypted packet EP transmitted at a 10th transmission from the node N2 in the past and the encrypted packet EP received this time is a packet transmitted at an 11th transmission from the node N2.

Thus, the received encrypted packet EP can be determined as being a proper encrypted packet EP. The node N1 retains in the node DB 110 of the node N1, the transmission counter value "11", as a new reception counter value associated with the node N2.

(4) When transmitting an encrypted packet EP at a 12th transmission, the node N2 updates the transmission counter value stored in the storage device of the node N2 from "11" to "12". Then, (5) the node N2 transmits to the node N1, the encrypted packet EP that is encrypted from a packet P that is to be transmitted and includes the updated transmission counter value "12".

(6) The node N1 receives the encrypted packet EP, decrypts the encrypted packet EP, and compares the transmission counter value "12" extracted from the decrypted packet P with the reception counter value "11" retained in the node DB 110 of the node N1. In this case, the node N1 has received an encrypted packet EP transmitted at an 11th transmission from the node N2 in the past and the encrypted packet EP received this time is a packet transmitted at a 12th transmission from the node N2.

Thus, the received encrypted packet EP can be determined as being a proper encrypted packet EP. The node N1 retains in the node DB 110 of the node N1, the transmission counter value "12", as a new reception counter value associated with the node N2.

Also when transmitting an encrypted packet EP at a 13th or subsequent transmission, similar to (4) and (5), the node N2 updates the transmission counter value and transmits an encrypted packet EP that includes the updated counter value. The node N1 receives the encrypted packet EP, determines the validity of the received encrypted packet EP, and updates the node DB 110, similar to (6). The node N2 is assumed to transmit the encrypted packet EP 15 times in the same manner.

Here, as depicted in FIG. 1B, an example is taken where a node Nc of an attacker performing a resend attack is connected to the ad hoc network A. (7) When transmitting an encrypted packet EP at a 16th transmission, the node N2 updates the transmission counter value stored in the storage device of the node N2 from "15" to "16". Then, (8) the node N2 transmits to the node N1, the encrypted packet EP that is encrypted from a send packet P and includes the updated transmission counter value "16".

(9) The node N1 receives the encrypted packet EP, decrypts the encrypted packet EP, and compares the transmission counter value "16" extracted from the decrypted packet P with the reception counter value "15" retained in the node DB 110 of the node N1. In this case, the node N1 has received an encrypted packet EP transmitted at a 15th transmission from the node N2 in the past and the encrypted packet EP received this time is a packet transmitted at 16th transmission from the node N2. Thus, the node N1 can determine the received encrypted packet EP as being a proper encrypted packet EP. The node N1 retains in the node DB 110 of the node N1, the transmission counter value "16", as a new reception counter value associated with the node N2.

On the other hand, (10) the encrypted packet EP transmitted from the node N2 is intercepted from the ad hoc network and retained for the resend attack by the node Nc of the attacker. Subsequently, the node N1 is subject to the resend attack by the node Nc of the attacker.

For example, as depicted in FIG. 1C, (11) the node Nc of the attacker retransmits to the node N1, the encrypted packet EP retained at (10). Here, (12) the node N1 decrypts the received encrypted packet EP and compares the transmission counter value "16" extracted from the decrypted packet P with the reception counter value "16" retained in the node DB 110 of the node N1.

In this case, despite the node N1 having received an encrypted packet EP transmitted at a 16th transmission from the node N2 in the past, the encrypted packet received this time is also an encrypted packet transmitted at a 16th transmission from the node N2. Consequently, the node N1 can determine the received encrypted packet EP as being an invalid packet. The node N1 discards the invalid packet.

This enables the node N1 to discard only the invalid packet transmitted from the node Nc of the attacker without discarding the encrypted packet EP transmitted from the node N2, thereby preventing the resend attack and guaranteeing communication security. Due to the discarding of the invalid packet, the node N1 need not perform processes based on the content of the invalid packet, reducing the process load of the node N1.

Since the invalid packet can be determined without the need for the time synchronization, the communication load caused by the time synchronizing packet can be prevented. Furthermore, since the time synchronization is not necessary, the invalid packet can be determined even if the gateway transmitting the time synchronizing packet is not in the ad hoc network A.

FIG. 2 is an explanatory view of an example of a network system according to the embodiment. In FIG. 2, a network system 200 is configured to include plural nodes N (nodes N1 to Nm). Here, m is the number of nodes in the ad hoc network A. In the network system 200, the nodes N are connected via the ad hoc network A.

Each node N is a radio communication device that performs multi-hop communication with other nodes (hereinafter, "neighboring nodes") in a predetermined communication area. Each node N in the ad hoc network A has a common key (hereinafter, "fixed key FK") of the ad hoc network A. Accordingly, each node N can perform encrypted communication with the neighboring nodes using the fixed key.

Each node N has a function of generating an access key AK used for encryption of a packet P to be transmitted to the node N (hereinafter, AK1 to AKm indicate access keys AK generated by the nodes N1 to Nm, respectively). After generating an access key AK by a generation function for generating the access key AK, the node N encrypts the node number and the access key AK thereof using the fixed key FK and performs uni-hop communication with neighboring nodes. Uni-hop communication refers to a transmission of the encrypted packet EP from the node N to only the neighboring nodes, which do not relay nor resend the encrypted packet EP to other nodes.

A node receiving the encrypted packet EP that includes the node number and the access key AK, decrypts the node number and the access key AK using the fixed key and retains the node number and the access key AK in a database (e.g. the node DB 110) of the node. In other words, the nodes N1 to Nm have the access keys AK of the neighboring nodes but do not have the access keys AK of nodes other than the neighboring nodes. The node number is included in an unencrypted portion of the encrypted packet EP, such as the header.

When a node N performs the encrypted communication with a neighboring node using the access key AK, the node N transmits to the neighboring node, an encrypted packet EP that is encrypted using an access key AK that is associated with the node number of the neighboring node and retained in the database of the node. The neighboring node that receives the encrypted packet EP, decrypts the encrypted packet EP using the access key AK thereof.

Each node N generates an access key AK at a given interval, encrypts the generated access keys AK using the fixed key FK, and sends the encrypted keys AK to neighboring nodes. By updating the access key at a given interval in this manner, each node N can reduce the risk of a resend attack.

The network system 200 is applicable for example to a system that collects household power or gas consumption. For example, by building the nodes N1 to Nm into a household power meter or gas meter, the household power or gas consumption is exchanged between nodes of the ad hoc network A. The household power or gas consumption may be measured by the nodes N1 to Nm or may be acquired from the power meter or gas meter through the nodes N1 to Nm.

A gateway in the ad hoc network A may transmit the household power or gas consumption received from the nodes N1 to Nm in the ad hoc network A, to servers of the power company or gas company by way of a network. As a result, the power or gas consumption can be collected without a need for a worker to physically go to the site.

The network system 200 encrypts the packet P using the fixed key FK of the ad hoc network A and the access key AK to the nodes. This assures secure communication (data confidentiality, tampering prevention, etc.) of the ad hoc network A.

FIG. 3 is a block diagram of a hardware configuration example of a node N according to the embodiment. In FIG. 3, the node N includes a CPU 301, a RAM 302, a flash memory 303, an I/F 304, and an encrypting circuit 305, respectively connected via a bus 300.

The CPU 301 provides overall control of the node N. The RAM 302 is used as a work area of the CPU 301. The RAM 302 stores the transmission counter value and the reception counter value that are often rewritten. The flash memory 303 stores a program or key information of encryption keys (fixed key FK and access key AK), etc. The RAM 302 may also store the access key AK that is often rewritten. The I/F 304 transmits and receives a packet through the multi-hop communication.

The encrypting circuit 305 is a circuit that encrypts data by using the encryption key. The encrypting circuit 305 further serves as a circuit that decrypts encrypted data by using a decryption key. In the case of executing the encryption and decryption on a software basis, a program corresponding to the encrypting circuit 305 may be stored in the flash memory 303, whereby the encrypting circuit 305 becomes unnecessary.

FIG. 4 is an explanatory view of an example of the contents of the node DB 110 depicted in FIGS. 1A, 1B, and 1C. As depicted in FIG. 4, the node DB 110 has an access key field and a reception counter value field that are respectively associated with a node number field. The node DB 110 forms a record each time the node receives a packet.

The node number field stores identifiers (N1 to Nm) of the nodes N in the ad hoc network A. Although for the purpose of simplification, the identifiers are denoted as N1 to Nm, the identifiers may be a media access control (MAC) address or an internet protocol (IP) address that are network addresses unique to the nodes N.

The access key field stores access keys AK used for the encryption of the packets to be transmitted to the nodes respectively having a unique node number. The access key AK is for example binary data on the order of 128 to 256 bits. The reception counter value field stores transmission counter values included in the encrypted packets EP received from nodes respectively having a unique node number.

Figure 5:
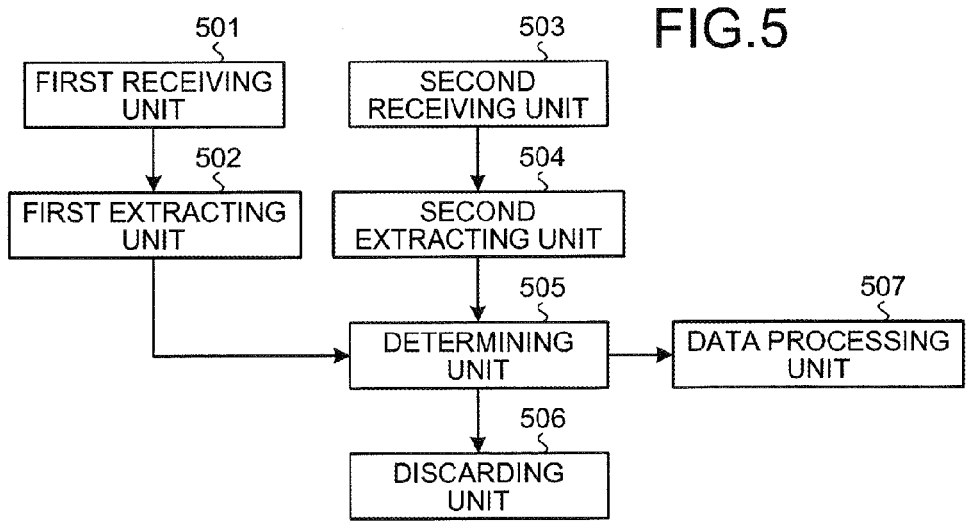
FIG. 5 is a block diagram of a functional configuration of the node N for reception.
Figure 6:
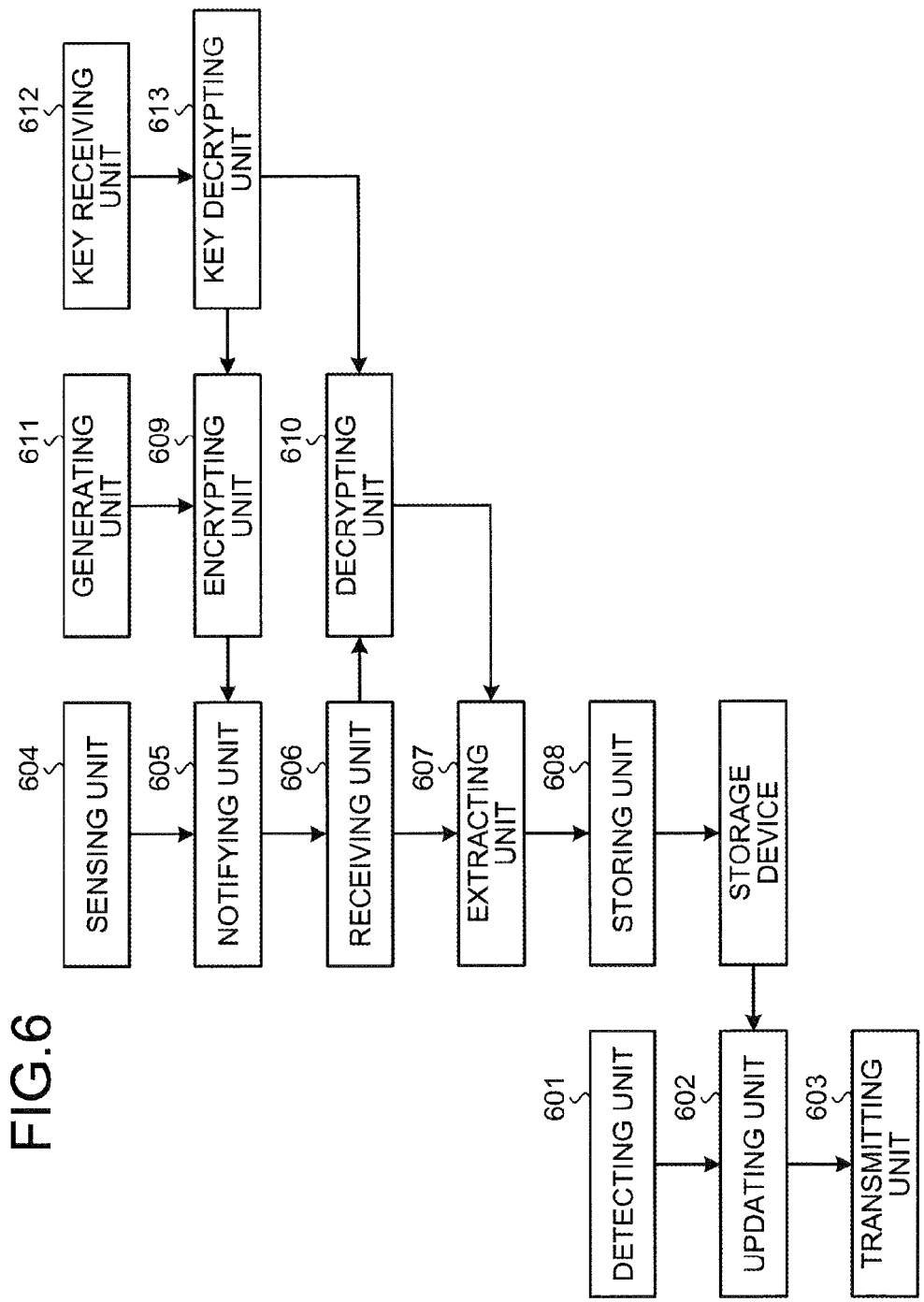
FIG. 6 is a block diagram of a functional configuration of the node N for transmission.

With reference to FIGS. 5 and 6, a functional configuration example of a node N will be described. FIG. 5 depicts an example of a functional configuration for reception. FIG. 6 depicts an example of a functional configuration for transmission. Although here configurations for reception and transmission are described separately for the sake of convenience, each node N has functions for both reception and transmission.

FIG. 5 is a block diagram of a functional configuration of the node N for reception. As depicted in FIG. 5, the node N includes a first receiving unit 501, a first extracting unit 502, a second receiving unit 503, a second extracting unit 504, a determining unit 505, a discarding unit 506, and a data processing unit 507.

The first receiving unit 301 has a function of receiving a first packet that includes a sender address of a neighboring node of the node N in the ad hoc network A and a first count of packet transmission from the neighboring node. As used herein, a neighboring node refers to another node located within a predetermined communication area of the node N. The sender address refers to the identifier of the node N. The first packet transmission count refers to the transmission counter value. The first packet refers to a packet transmitted from the neighboring packet and is for example the encrypted packet EP.

For example, the first receiving unit 501 receives from a neighboring node an encrypted packet EP that is encrypted using the fixed key FK or the access key AK. A function of the first receiving unit 501 is implemented by the I/F 304 or by causing the CPU 301 to execute a program stored in the flash memory 303 depicted in FIG. 3.

The first extracting unit 502 has a function of extracting the first packet transmission count from the first packet received by the first receiving unit 501. For example, the first extracting unit 502 decrypts the encrypted packet EP using the fixed key FK or the access key AK, and extracts the transmission counter value included in the decrypted packet P. As a result, the first extracting unit 502 can know that the encrypted packet EP received by the first receiving unit 501 is an encrypted packet EP transmitted at an n-th transmission from the neighboring node.

A function of the first extracting unit 502 is implemented by causing the CPU 301 to execute a program stored in the flash memory 303 depicted in FIG. 3.

The second receiving unit 503 has a function of, after the reception of the first packet by the first receiving unit 501, receiving a second packet that includes a sender address of a neighboring node and a second count of packet transmission from the neighboring node. Here, the second packet may be a proper encrypted packet EP transmitted from the neighboring node. On the contrary, the second packet may be an encrypted packet having the node number of the neighboring node but transmitted from a node Nc of an attacker that has intercepted an encrypted packet transmitted from the neighboring node in the past. The second packet transmission count refers to a transmission counter value included in the second packet.

For example, the second receiving unit 503 receives an encrypted packet EP that is encrypted using the fixed key FK or the access key AK. For example, the second receiving unit 503 is implemented by the I/F 304 or by causing the CPU 301 to execute a program stored in the flash memory 303 depicted in FIG. 3.

The second extracting unit 504 has a function of extracting the second packet transmission count from the second packet received by the second receiving unit 503. For example, the second extracting unit 504 decrypts the encrypted packet EP by using the fixed key FK or the access key AK and extracts the transmission counter value included in the decrypted packet P. As a result, the second extracting unit 504 can know that the encrypted packet EP received by the second receiving unit 503 is an encrypted packet EP transmitted at an n-th transmission from the neighboring node.

For example, the second extracting unit 504 is implemented by causing the CPU 301 to execute a program stored in the flash memory 303 depicted in FIG. 3.

The determining unit 505 has a function of determining whether the second packet is an invalid packet based on the first packet transmission count extracted by the first extracting unit 502 and on the second packet transmission count extracted by the second extracting unit 504.

For example, the determining unit 505 determines the second packet as being a proper packet if the transmission counter value in the encrypted packet EP received this time is greater than the transmission counter value in the encrypted packet EP received the last time and determines the second packet as being an invalid packet if the transmission counter value in the encrypted packet EP received this time is not greater.

As long as a proper encrypted packet EP continues to be received from neighboring nodes, the transmission counter value in the encrypted packet EP received is greater than the transmission counter value in the encrypted packet EP received the last time. Thus, the determining unit 505 determines the second packet as being a proper packet.

In a resend attack, on the other hand, the encrypted packet EP transmitted in the past is transmitted as it is and consequently, the transmission counter value in the encrypted packet EP received is less than or equal to the transmission counter value in the encrypted packet EP received the last time. Thus, the determining unit 505 determines the second packet as being an invalid packet, consequent to a resend attack.

Thus, the determining unit 505 can determine whether the encrypted packet EP received by the second receiving unit 503 is an invalid packet. For example, the determining unit 505 is implemented by causing the CPU 301 to execute a program stored in the flash memory 303 depicted in FIG. 3.

The discarding unit 506 has a function of discarding the second packet if the second packet is determined as an invalid packet by the determining unit 505. For example, the discarding unit 506 discards the second packet without performing a process even though the content of the second packet is a request for the process or without performing the multi-hop communication of the second packet.

Consequently, the discarding unit 506 can prevent an invalid packet from being further transmitted to other nodes and can reduce the process load on the nodes N, arising from the execution of the content of the invalid packet. For example, the discarding unit 506 is implemented by causing the CPU 301 to execute a program stored in the flash memory 303 depicted in FIG. 3.

The data processing unit 507 has a function of performing a process based on the content of an encrypted packet EP that is not determined as being an invalid packet. For example, the data processing unit 507 transmits the encrypted packet EP to other nodes through the multi-hop communication or performs a process when the content of the encrypted packet EP is a request for the process. This allows a proper packet to be properly processed. For example, the data processing unit 507 is implemented by the I/F 304 or by causing the CPU 301 to execute a program stored in the flash memory 303 depicted in FIG. 3.

FIG. 6 is a block diagram of a functional configuration of the node N for transmission. As depicted in FIG. 6, the node N includes a detecting unit 601, an updating unit 602, and a transmitting unit 603. The node N includes a sensing unit 604, a notifying unit 605, a receiving unit 606, an extracting unit 607, and a storing unit 608. The node N includes an encrypting unit 609, a decrypting unit 610, a generating unit 611, a key receiving unit 612, and a key decrypting unit 613.

The detecting unit 601 has a function of detecting an event of packet transmission to a neighboring node of the node N in the ad hoc network. As used herein, a neighboring node refers to another node located within a predetermined communication area of the node N. The transmission event refers to an event acting as a trigger for transmission of an encrypted packet EP to a neighboring node and, for example, may be a send command input by the user of the node N or a send command automatically generated by a program stored in the flash memory 303 of the node N.

Thus, the detecting unit 601 can detect a trigger for transmitting an encrypted packet EP. For example, the detecting unit 601 is implemented by causing the CPU 301 to execute a program stored in the flash memory 303 depicted in FIG. 3.

The updating unit 602 has a function of, when the packet transmission event is detected by the detecting unit 601, updating the count of packet transmissions from the node N, retained in a storage device of the node N to a value obtained by adding 1 to the packet transmission count. In this case, the storage device refers to the RAM 302 depicted in FIG. 3. The packet transmission count is the transmission counter value.

For example, the updating unit 602 increments the transmission counter value retained in the RAM 302 for updating. Accordingly, the updating unit 602 can calculate the value of "n" for the encrypted packet EP transmitted at an n-th transmission from the transmitting unit 603, as described later, and can update the transmission counter value. For example, the updating unit 602 is implemented by causing the CPU 301 to execute a program stored in the flash memory 303 depicted in FIG. 3.

The transmitting unit 603 has a function of transmitting to a neighboring node, a packet that includes the packet transmission count updated by the updating unit 602. For example, the transmitting unit 603 transmits to a neighboring node, an encrypted packet EP that includes the updated transmission counter value. As a result, the transmitting unit 603 can notify a neighboring node that the encrypted packet EP transmitted from the node is the n-th encrypted packet EP. For example, the transmitting unit 603 is implemented by causing the CPU 301 to execute a program stored in the flash memory 303 depicted in FIG. 3.

The sensing unit 604 has a function of sensing a deletion of the count of packet transmission from the node N retained in the storage device of the node N. For example, the sensing unit 604 senses a deletion of the transmission counter value as a result of a power failure or an initialization of the transmission counter value by the user of the node N. Thus, the sensing unit 604 can sense a deletion of the transmission counter value that is to be included in an encrypted packet EP to be transmitted and suspend the encrypted communication. For example, the sensing unit 604 is implemented by causing the CPU 301 to execute a program stored in the flash memory 303 depicted in FIG. 3.

The notifying unit 605 has a function of, when deletion is sensed by the sensing unit 604, notifying a neighboring node of a request packet for the count of packet transmissions from the node, the count being retained in the storage device of the neighboring node. Here, the count of packet transmissions from the node, retained in the storage device of the neighboring node means the reception counter value stored in the node DB 110 of the neighboring node.

For example, the notifying unit 605 transmits to a neighboring node, an encrypted packet EP that includes a transmission counter value "0" that is predefined as a counter value for the request for the reception counter value by the node N in the ad hoc network. Accordingly, the notifying unit 605 can request of a neighboring node, a transmission counter value included in the encrypted packet EP transmitted from the node of the notifying unit 605 in the past. For example, the notifying unit 605 is implemented by the I/F 304 or by causing the CPU 301 to execute a program stored in the flash memory 303 depicted in FIG. 3.

The receiving unit 606 has a function of, as a result of a notification of the request packet by the notifying unit 605, receiving a packet including the count of packet transmissions from the node returned from a neighboring node. For example, the receiving unit 606 receives from a neighboring node, an encrypted packet EP that includes the transmission counter value that was included in the encrypted packet EP transmitted from the node of the receiving unit 606 in the past. For example, the receiving unit 606 is implemented by the I/F 304 or by causing the CPU 301 to execute a program stored in the flash memory 303 depicted in FIG. 3.

The extracting unit 607 has a function of extracting from the response packet received by the receiving unit 606, the count of packet transmissions from the node. For example, the extracting unit 607 extracts from the response packet, the reception counter value stored in the node DB 110 of the neighboring node.

Accordingly, the extracting unit 607 can extract the reception counter value of another node, the reception counter value being a past transmission counter value of the node of the extracting unit 607. For example, the extracting unit 607 is implemented by causing the CPU 301 to execute a program stored in the flash memory 303 depicted in FIG. 3.

The storing unit 608 has a function of storing into the storage device of the node, the count of packet transmissions from the node, the count being extracted by the extracting unit 607. For example, the storing unit 608 stores into the RAM 303, the reception counter value included in the request packet, in lieu of the deleted transmission counter value.

Accordingly, the storing unit 608 can newly store a transmission counter value to be included in the send encrypted packet EP so that the node N can resume the encrypted communication. For example, the storing unit 608 is implemented by causing the CPU 301 to execute a program stored in the flash memory 303 depicted in FIG. 3.

The encrypting unit 609 has a function of encrypting a request packet by using a common key possessed by each node in the ad hoc network. For example, using the fixed key FK or the access key AK, the encrypting unit 609 encrypts a packet for transmission. This enables the encrypting unit 609 to perform secure encrypted communication. For example, the encrypting unit 609 is implemented by the encrypting circuit 305 or by causing the CPU 301 to execute a program stored in the flash memory 303 depicted in FIG. 3.

The decrypting unit 610 has a function of decrypting a response packet by using the common key from a response packet that is encrypted using the common key by a neighboring node. For example, the decrypting unit 610 decrypts a received encrypted packet EP by using the fixed key FK or the access key AK. As a result, the decrypting unit 610 can decrypt the content of the encrypted packet EP. For example, the decrypting unit 610 is implemented by the encrypting circuit 305 or by causing the CPU 301 to execute a program stored in the flash memory 303 depicted in FIG. 3.

The generating unit 611 has a function of generating a random number that is first identification information. For example, the generating unit 611 generates a random number using a random numbers table. This enables the encrypted packet EP to include temporary identification information so that the secure encrypted communication can be performed. For example, the generating unit 611 is implemented by causing the CPU 301 to execute a program stored in the flash memory 303 depicted in FIG. 3.

The key receiving unit 612 has a function of, after sensing of a deletion by the sensing unit 604, receiving from a neighboring node, a second common key possessed by the neighboring node that is encrypted using a first common key each node N in the ad hoc network possesses. Here, the first common key is the fixed key FK. The second common key is the access key AK.

For example, the key receiving unit 612 receives the access key AK that is encrypted by the fixed key FK. As a result, the key receiving unit 612 can receive the access key AK from a neighboring node to perform secure encrypted communication. For example, the key receiving unit 612 is implemented by the I/F 304 or by causing the CPU 301 to execute a program stored in the flash memory 303 depicted in FIG. 3.

The key decrypting unit 613 has a function of decrypting a second common key using the first common key from the encrypted second common key received by the key receiving unit 612. For example, the key decrypting unit 613 decrypts the access key AK by using the fixed key FK. This enables the node N to perform secure encrypted communication with a neighboring node by using the access key AK. For example, the key decrypting unit 613 is implemented by the encrypting circuit 305 or by causing the CPU 301 to execute a program stored in the flash memory 303 depicted in FIG. 3. According to the node N, in this manner, a resend attack is simply and efficiently detected to achieve a reduction in the communication load. An example of the node N will be described herein.

A case will be described where the transmission counter value is the sum of the transmission counts of the encrypted packet EP in the transmitting nodes. By using the sum of the transmission counts, the transmission counter value need not be updated even when the destination neighboring node changes as a result of movement of the node N in the ad hoc network. In this manner, by using the sum of the transmission counts instead of the time information, a resend attack can simply and efficiently be detected to achieve a reduction in the communication load.

Figure 7:
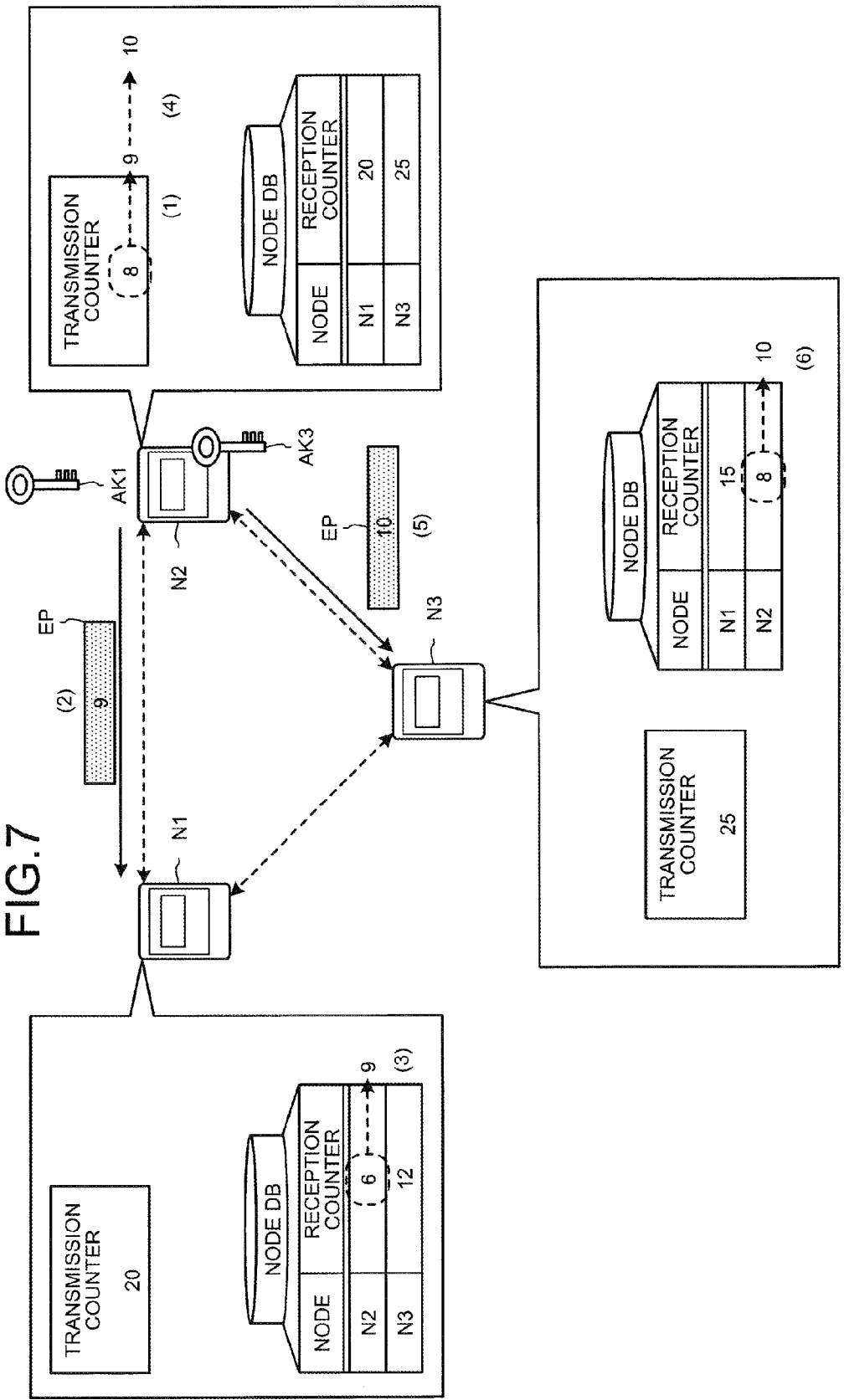
FIG. 7 is an explanatory view of encrypted communication using an access key AK in a network system 200.
Figure 8:
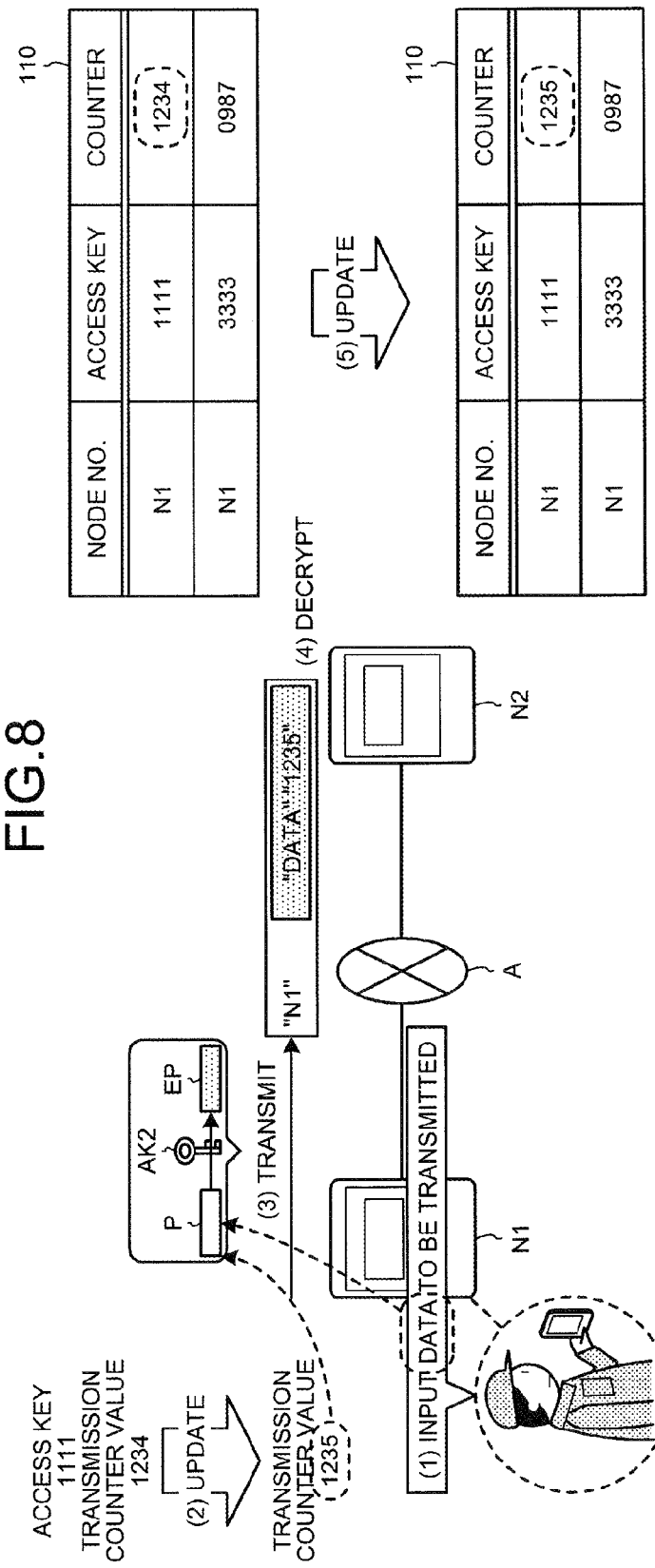
FIG. 8 is an explanatory view of details of the encrypted communication using the access key AK in the network system 200.

With reference to FIGS. 7 and 8, an example of encrypted communication using the access key AK according to a first example in the network system 200 of FIG. 2 will be described.

FIG. 7 is an explanatory view of encrypted communication using the access key AK in the network system 200. FIG. 7 assumes that the ad hoc network A includes nodes N1, N2, and N3.

(1) When transmitting an encrypted packet EP at a 9th transmission, the node N2 updates the transmission counter value stored in the storage device of the node N2 from "8" to "9". Then, (2) the node N2 transmits to the node N1, the encrypted packet EP that is encrypted from a packet P that is to be transmitted and includes the updated transmission counter value "9".

(3) The node N1 receiving the encrypted packet EP, extracts the sender node number and the transmission counter value from the packet P decrypted from the encrypted packet EP. The node N1 compares the transmission counter value "9" extracted from the decrypted packet P with the reception counter value "6" retained in the node DB 110 of the node N1. In this case, it can be seen that the node N1 has received a 6th encrypted packet EP transmitted from the node N2 in the past and that the encrypted packet EP received this time is a 9th packet transmitted from the node N2.

Thus, the received encrypted packet EP can be determined as being a proper encrypted packet EP. The node N1 retains in the node DB 110 of the node N1, the transmission counter value "9" as a new reception counter value associated with the node N2.

(4) When transmitting an encrypted packet EP at a 10th transmission, the node N2 updates the transmission counter value stored in the storage device of the node N2 from "9" to "10". Then, (5) the node N2 transmits to the node N3, the encrypted packet EP encrypted from a packet P that is to be transmitted and includes the updated transmission counter value "10".

(6) The node N3 receiving the encrypted packet EP, extracts the sender node number and the transmission counter value from the packet P decrypted from the encrypted packet EP. The node N3 compares the transmission counter value "10" extracted from the ecrypted packet P with the reception counter value "8" retained in the node DB 110 of the node N3. In this case, it can be seen that the node N3 has received an encrypted packet EP transmitted at an 8th transmission from the node N2 in the past and that the encrypted packet EP received this time is an packet transmitted at a 10th transmission from the node N2.

Thus, the received encrypted packet EP can be determined as being a proper encrypted packet EP. The node N3 retains in the node DB 110 of the node N3, the transmission counter value "10" as a new reception counter value associated with the node N2. With reference to FIG. 8, details of the encrypted communication using the access key in the network system 200 will be described.

FIG. 8 is an explanatory view of details of the encrypted communication using the access key AK in the network system 200. In FIG. 8, encrypted communication from the node N1 to the node N2 in the ad hoc network A will be described.

Here, a case will be described where the node number of the node N1 is "N1", the access key is "1111", and the counter is "1234".

In FIG. 8, (1) when receiving a data input from the user of the node N1, the node N1 starts the encrypted communication with the node N2. Here, the data input from the user is a trigger for starting the encrypted communication, but the trigger may be a data transmission event automatically generated by the node N1.

(2) The node N1 first increments the transmission counter value by 1. At this time, the transmission counter value of the node N1 becomes "1235". (3) Then, using an access key AK2 of the destination node N2, the node N1 encrypts the counter value "1235" and data to be transmitted, and performs uni-hop communication thereof together with the node number "N1" of the node N1. The node number "N1" is included in an unencrypted data portion such as the header. In the following description, similarly, the node number "N1" is included in an unencrypted data portion such as the header. Alternatively, the node number may be included in an encrypted data portion.

The node N2 receiving an encrypted packet EP from the node N1, identifies from the node number, the node N1 as the sender of the encrypted packet EP. (4) The node N2 then refers to the node DB 110 thereof and decrypts the received encrypted packet EP using the access key AK2 of the node N2.

(5) The node N2 then extracts the transmission counter value from the decrypted packet P and compares the transmission counter value with the reception counter value retained in the node DB 110. Since the transmission counter value "1235" is greater than the reception counter value "1234", the node N2 regards the decrypted packet P as being properly decrypted and updates the reception counter value of the node number "N1" of the node DB 110, to the counter value "1235" of the packet P.

If the received transmission counter value is less than or equal to the retained reception counter value, the node N2 regards the received encrypted packet EP as being an invalid packet and discards the received encrypted packet EP. The node N2 may regard the received encrypted packet EP as being properly decrypted if the difference from the retained reception counter value does not exceed a predetermined threshold value.

A case will next be described where the node N updates the access key AK in the network system 200 of FIG. 2.

Figure 9:
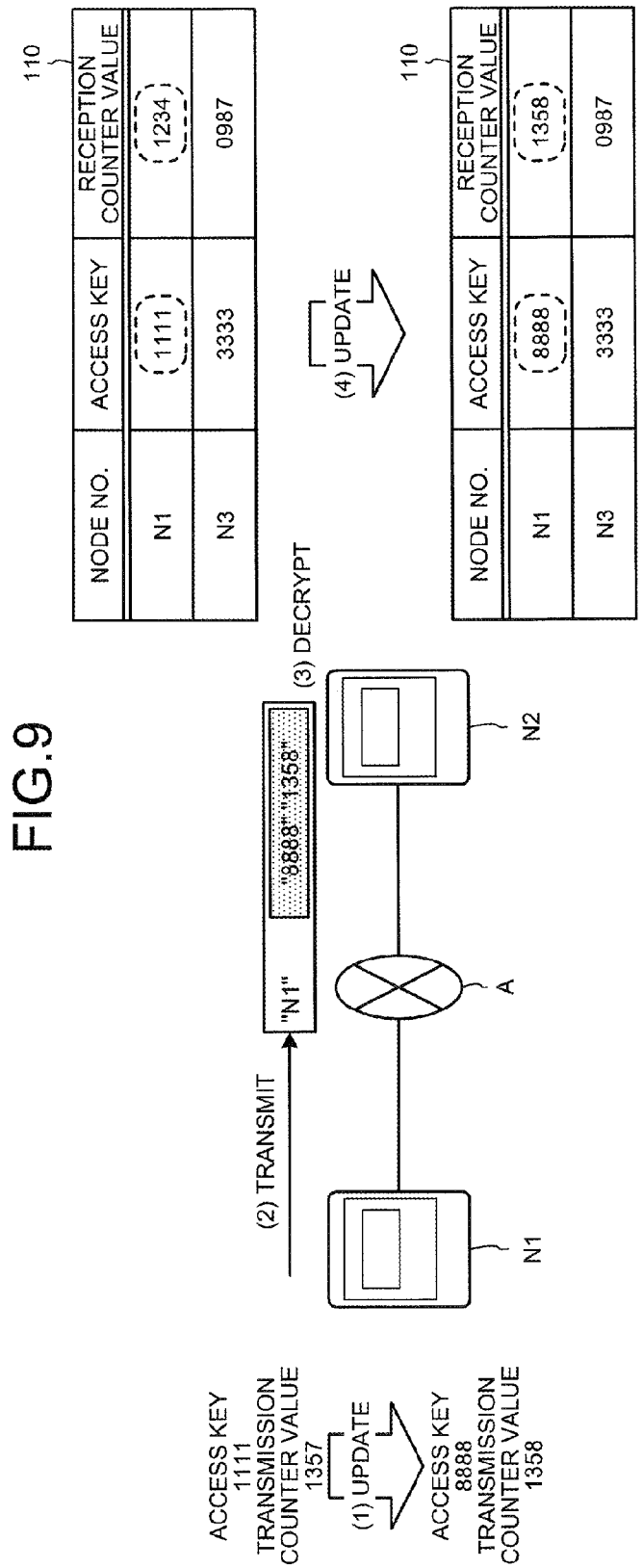
FIG. 9 is an explanatory view of an updating example of the access key AK in the network system 200.

FIG. 9 is an explanatory view of an updating example of the access key AK in the network system 200. In FIG. 9, encrypted communication from the node N1 to the node N2 in the ad hoc network A will be described. Here, a case will be described where the node number of the node N1 is "N1", the access key is "1111", and the reception counter value is "1234".

In FIG. 9, (1) when the node N1 updates the access key AK, the node N1 first generates a new access key AK "8888". The node N1 then increments the transmission counter value. At this time, the transmission counter value of the node N1 becomes "1358".

(2) Then, the node N1 encrypts the transmission counter value "1358" and the new access key AK "8888" using the fixed key FK of the ad hoc network A and performs uni-hop communication thereof together with the node number "N1" of the node N1. The node number "N1" is included in an unencrypted data portion such as the header, for transmission.

The node N2 receiving the encrypted packet EP from the node N1, identifies from the node number, the node N1 as the sender of the encrypted packet EP. (3) The node N2 then decrypts the encrypted packet EP using the retained fixed key FK and acquires the transmission counter value "1358" and the new access key AK "8888" from the decrypted packet P.

The node N2 then compares the transmission counter value "1358" and the reception counter value "1234" retained in the node DB. Since the transmission counter value "1358" greater than the reception counter value "1234", the node N2 regards the decrypted packet P as being properly decrypted. (4) The node N2 then updates the reception counter value of the node number "N1" of the node DB 110, to the transmission counter value "1358" of the received packet, and updates the access key AK "1111" to the new access key AK "8888".

If the received transmission counter value is less than or equal to the retained reception counter value, the node N2 regards the received encrypted packet EP as being an invalid packet and discards the received encrypted packet EP. The node N2 may regard the received encrypted packet EP as being properly decrypted if the difference from the retained reception counter value does not exceed a predetermined threshold value.

An example of setting at the time of the introduction of a new node into the network system 200 of FIG. 2 will be described.

Figure 10:
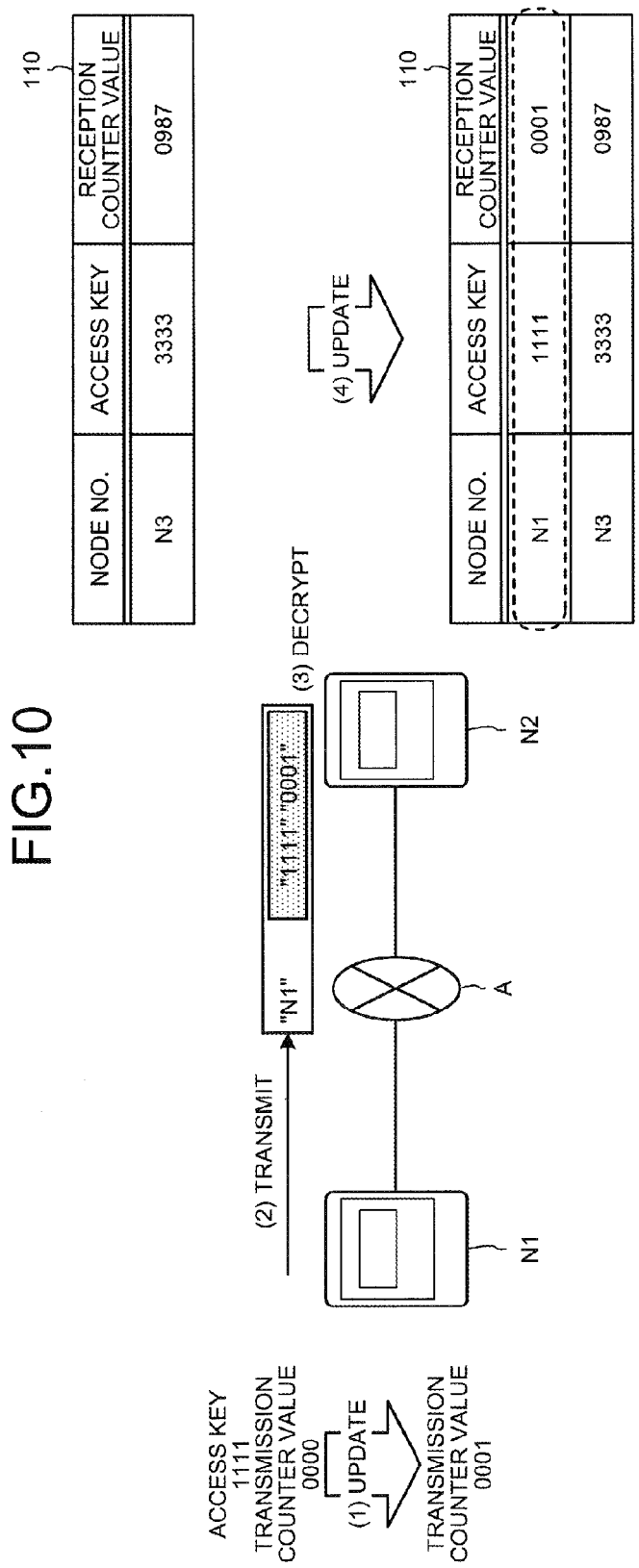
FIG. 10 is an explanatory view of an example of introduction of a new node into the network system 200.

FIG. 10 is an explanatory view of an example of introduction of the new node into the network system 200. In FIG. 10, a new node is introduced into the ad hoc network A of the network system 200. FIG. 10 depicts a case where a new node N1 is added to the node N2 in the ad hoc network A.

(1) The new node N1 first generates an access key AK "1111". The new node N1 then increments the transmission counter value to "0001". (2) Then, the new node N1 encrypts the transmission counter value "0001" and the access key AK "1111" using the fixed key FK and performs uni-hop communication thereof together with the node number "N1". The node number "N1" is included in an unencrypted data portion such as the header.

The node N2 receiving the encrypted packet EP from the node N1, identifies from the node number, the node N1 as being a sender of the encrypted packet. (3) The node N2 then decrypts the encrypted packet using the retained fixed key FK and acquires the transmission counter value "0001" and the access key AK "1111".

The node N2 attempts to compare the transmission counter value and the reception counter value retained in the node DB 110 but does not have the reception counter value corresponding to the node number "N" in the node DB 110. Accordingly, the node N2 recognizes that the communication with the node N1 is a first communication and stores to the node DB 110, the node number "N1", the access key AK "1111" as the corresponding access key AK, and the transmission counter value "0001" as the corresponding reception counter value.

Here, the node N1 need not be a newly added node and, even if the transmission counter value is not "0000", a similar process is performed if no information of the node number "N1" is entered in the node DB 110 of the node N2. An example is a case where the node N1 moves to the vicinity of the node N2 if the node N1 is mobile, for example.

A packet transmission process in the encrypted communication will be described.

Figure 11:
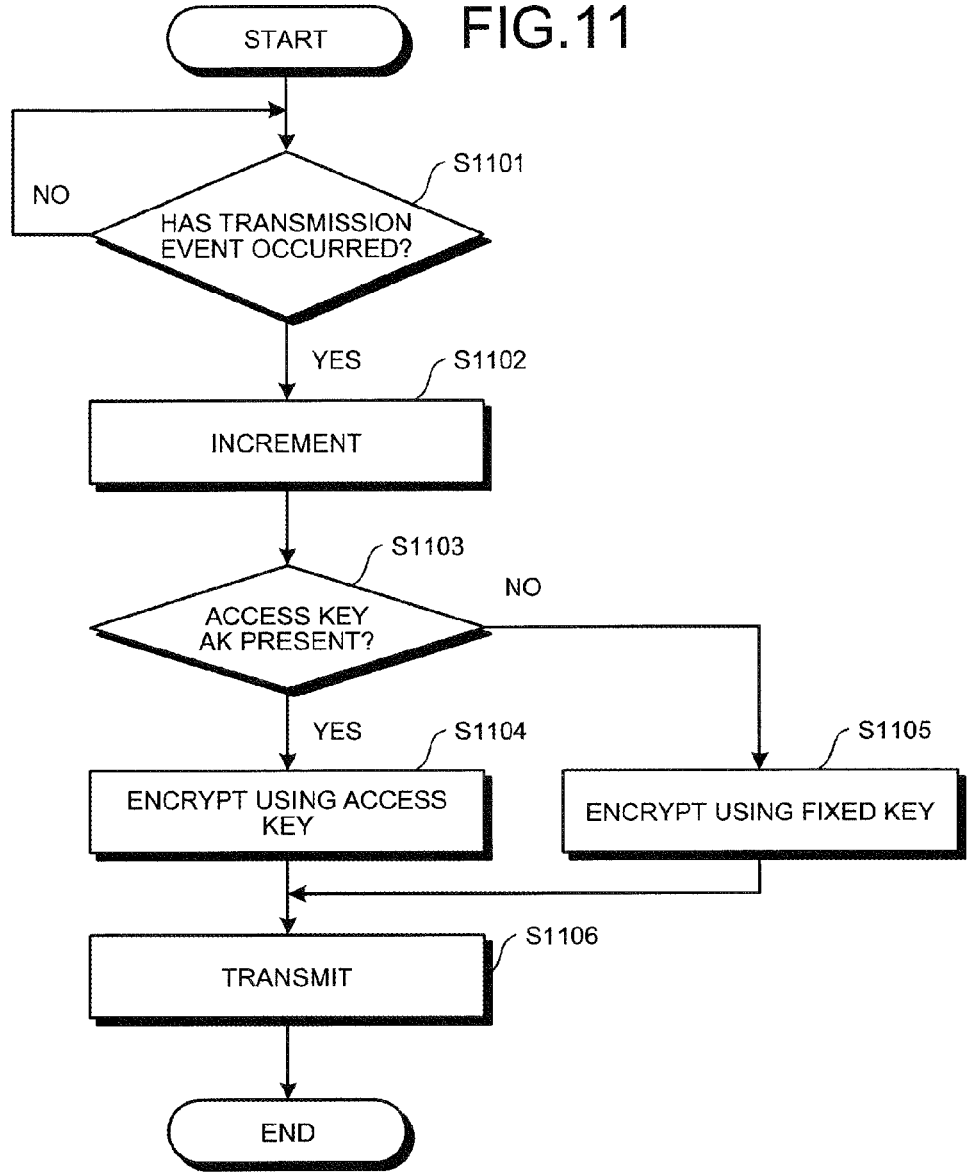
FIG. 11 is a flowchart of details of a packet transmission process in the encrypted communication.

FIG. 11 is a flowchart of details of the packet transmission process in the encrypted communication. First, the CPU 301 determines whether a transmission event has occurred (step S1101). If no transmission event has occurred (step S1101: NO), the CPU 301 returns to step S1101.

On the other hand, if the transmission event has occurred (step S1101: YES), the CPU 301 increments the transmission counter value (step S1102). The CPU 301 then determines whether the access key AK of the destination node N is in the node DB 110 (step S1103).

If the access key AK is present (step S1103: YES), the CPU 301 encrypts, using the access key AK, a packet that is to be transmitted (step S1104) and transmits an encrypted packet EP to a destination node N (step S1106). The CPU 301 then terminates the packet transmission process.

If the access key AK is not present (step S1103: NO), the CPU 301 encrypts, using the fixed key FK, a packet that is to be transmitted (step S1105) and transmits the encrypted packet EP to a destination node N (step S1106). The CPU 301 then terminates the packet transmission process.

A packet receiving process in the encrypted communication will be described.

Figure 12:
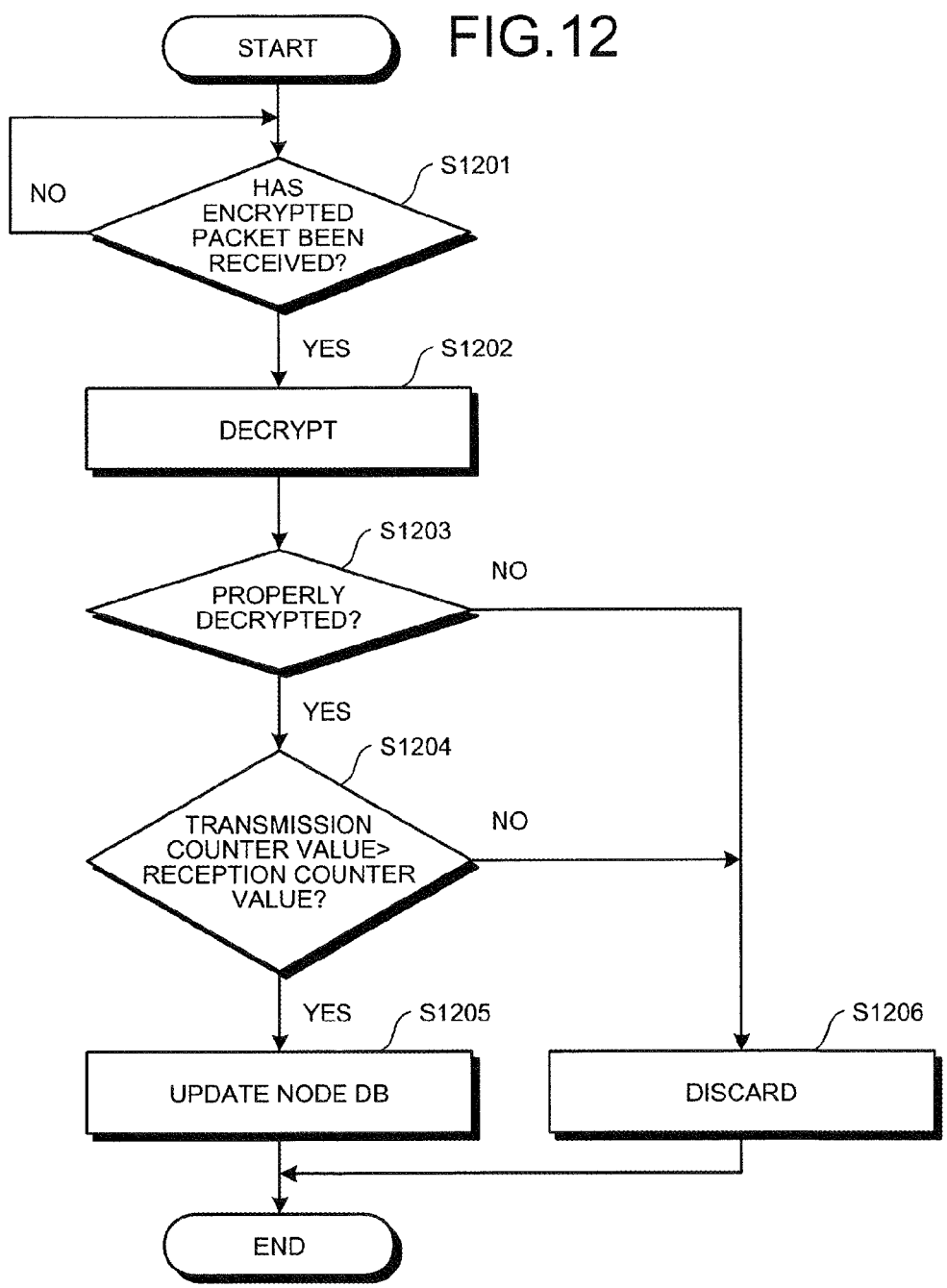
FIG. 12 is a flowchart of details of a packet receiving process in the encrypted communication.

FIG. 12 is a flowchart of details of the packet receiving process in the encrypted communication. First, the CPU 301 determines whether an encrypted packet EP has been received (step S1201). If no encrypted packet EP has been received (step S1201: NO), the CPU 301 returns to step S1201.

On the other hand, if an encrypted packet EP has been received (step S1201: YES), the CPU 301 decrypts the encrypted packet EP using the access key AK of the node of the CPU 301 or the fixed key FK (step S 1202), and determines whether the encrypted packet EP is properly decrypted (step S1203). If the encrypted packet EP is not properly decrypted (step S1203: NO), the CPU 301 discards the received encrypted packet EP as being an invalid packet (step S1206) to terminate the packet receiving process.

On the other hand, if the encrypted packet EP is properly decrypted (step S1203: YES), the CPU 301 determines whether the transmission counter value in the decrypted packet P is greater than the reception counter value in the node DB 110 (step S1204). If the transmission counter value is not greater than the reception counter value (step S1204: NO), the CPU 301 discards the received encrypted packet EP as being an invalid packet (step S1206) to terminate the packet receiving process.

On the other hand, if the transmission counter value is greater than the reception counter value (step S1204: YES), the CPU 301 determines the received encrypted packet EP as being a proper packet and updates the node DB 110 (step S1205) to terminate the packet reception process. The updating of the node DB 110 refers to the updating in (5) of FIG. 8, the updating in (4) of FIG. 9, and the updating in (4) of FIG. 10.

A case will be described where the transmission counter value of the node N is deleted. An example is a case where the node N is supplied with no power due to a power failure, whereby the contents (the transmission counter value, the reception counter value, and the access key AK) of the RAM 302 are deleted. An example may be a case where the RAM 302 is reset by a user operation.

In this case, the node N cannot know the transmission counter value included in the encrypted packet EP transmitted from the node N in the past and consequently, cannot know the transmission counter value to be included in the encrypted packet EP that is be transmitted thereafter, making return to the ad hoc network A impossible.

Figure 13:
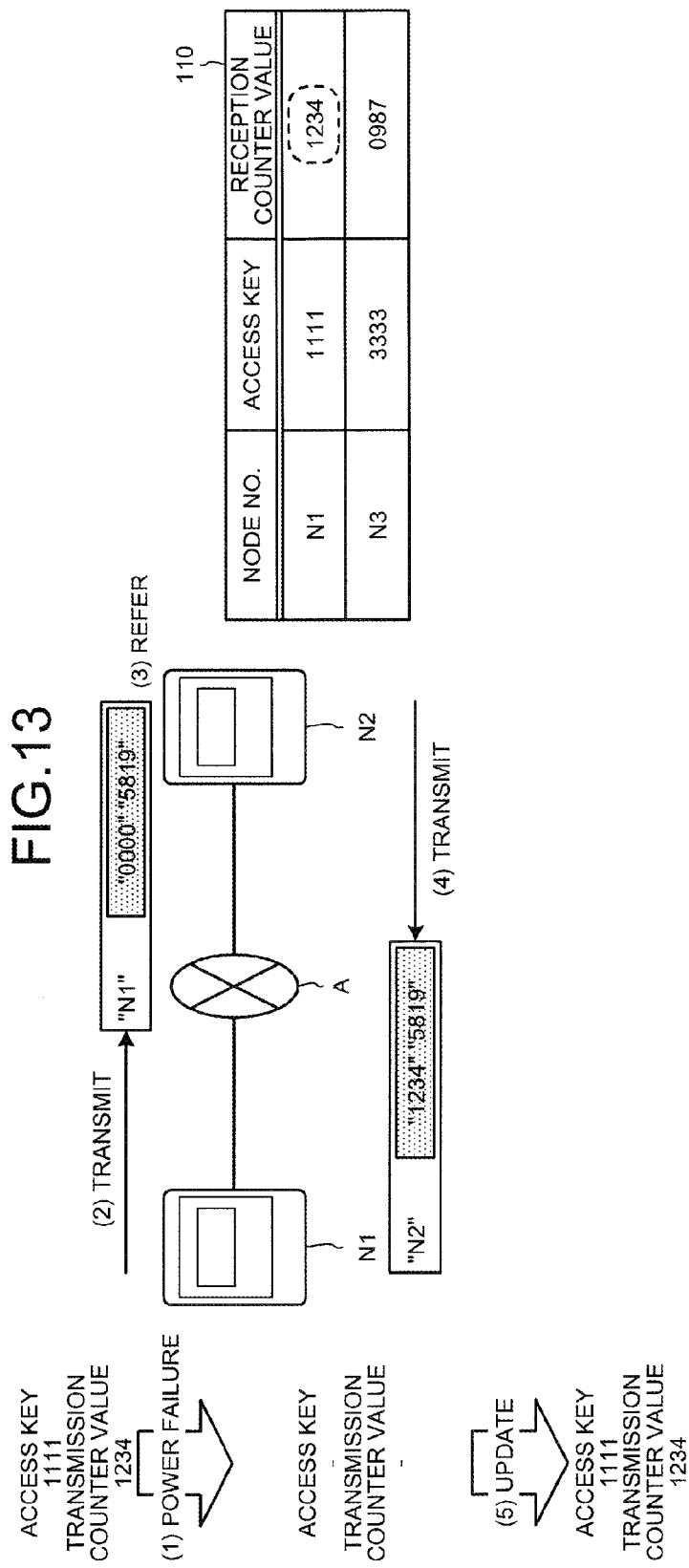
FIG. 13 is an explanatory view of an operation example 1 when a transmission counter value of a node is deleted.

FIG. 13 is an explanatory view of an operation example 1 when the transmission counter value of a node is deleted. In FIG. 13, (1) the node N1 is assumed to suffer a power failure. Consequently, the transmission counter value and the access key AK retained by the node N1 are assumed to be deleted.

(2) In this case, the node N1 generates a random number "5819" and creates a packet that includes the random number "5819" and a specific transmission counter value "0000" indicating a request for the reception counter value of the node N1 (the reception counter value being retained in the node DB 110 of the node N2), and encrypts the packet using the fixed key FK. The node N1 then performs uni-hop communication with the node N2 of the encrypted packet EP and the node number "N1". The node number "N1" is included in an unencrypted portion such as the header. Similarly, in the following description, the node number is included in an unencrypted portion.

The node N2 receiving an encrypted packet EP from the node N1, identifies from the node number, the node N1 as the sender of the encrypted packet EP. The node N2 then decrypts the encrypted packet EP using the retained fixed key FK and acquires the transmission counter value "0000" and the random number "5819".

(3) Since the transmission counter value "0000" is a specific counter value indicating a request for the reception counter value, the node N2 refers to the node DB 110 and creates a packet that includes the reception counter value "1234" and the random number "5819", and encrypts the encrypted packet EP using the fixed key FK. (4) The node N2 then performs uni-hop communication with the node N1 of the encrypted packet EP together with the node number "N2".

(5) The node N1 receiving the encrypted packet EP from the node N2, decrypts the encrypted packet EP using the fixed key FK and acquires the reception counter value "1234" and the random number "5819" of the node N2. The node N1 verifies that the random number coincides with the random number transmitted from the node N1 and, if determined to be a proper packet, updates the transmission counter value of the node N1 to the reception counter value "1234" of the node N2.

When transmitting a request packet to plural nodes N, the greatest value among the reception counter values of each node is used as the transmission counter value of the node. Storage of the used random numbers can prevent a resend attack of the request packet.

Figure 14:
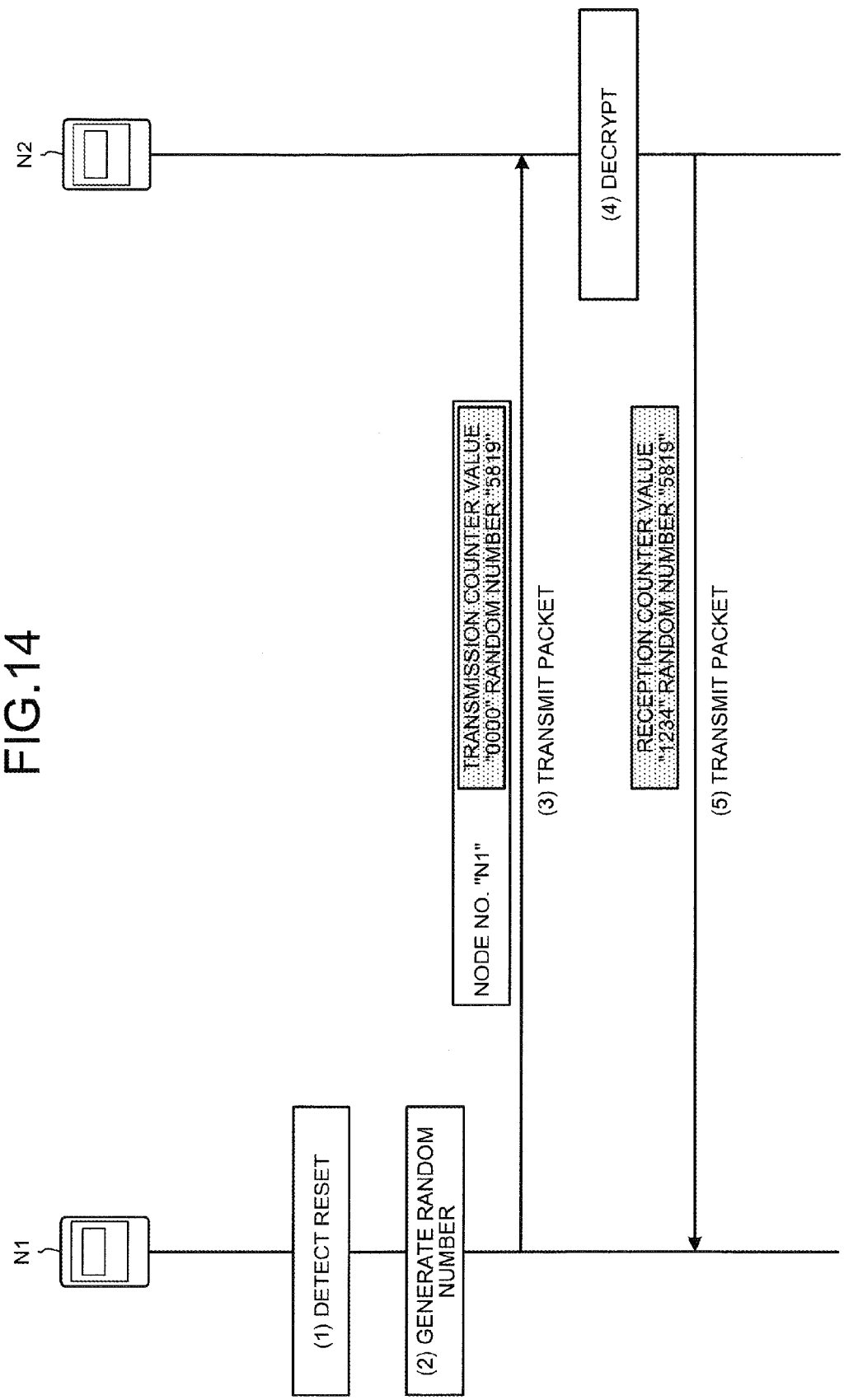
FIG. 14 is a sequence diagram of the operation example 1 when the transmission counter value of the node is deleted in FIG. 13.

FIG. 14 is a sequence diagram of the operation example 1 when the transmission counter value of the node is deleted in FIG. 13. In FIG. 14, (1) the node N1 senses the deletion of the transmission counter value, (2) generates a random number "5819", (3) encrypts, using the fixed key FK, the random number "5819" and a specific transmission counter value "0000" indicating a request for the reception counter value, and performs the uni-hop communication thereof together with the node number "N1" with a neighboring node.

(4) The node N2 receiving the encrypted packet EP, identifies from the node number, the node N1 as the sender of the packet, decrypts the encrypted packet EP using the fixed key FK, and acquires the transmission counter value "0000" and the random number "5819". The node N2 refers to the node DB 110 and, if the reception counter value of the node N1 is not retained therein, discards the encrypted packet EP.

(5) If the reception counter value is retained, the node N2 encrypts the reception counter value "1234" and the random number "5819" using the fixed key FK, and transmits the encrypted reception counter value "1234" and random number "5819" to the node N1. The node N1 receiving the encrypted packet EP from the node N2, decrypts the encrypted packet EP using the fixed key FK, and acquires the reception counter "1234" and the random number "5819". If the acquired random number coincides with the random number transmitted from the node N1, the node N1 updates the transmission counter value of the node N1, to the reception counter value of the node N2. If the acquired random number does not coincide, the node N1 discards the received encrypted packet EP as being an invalid packet. Here, the random number is used for detecting the transmission of an invalid packet from an attacker having no fixed key FK.

Figure 15:
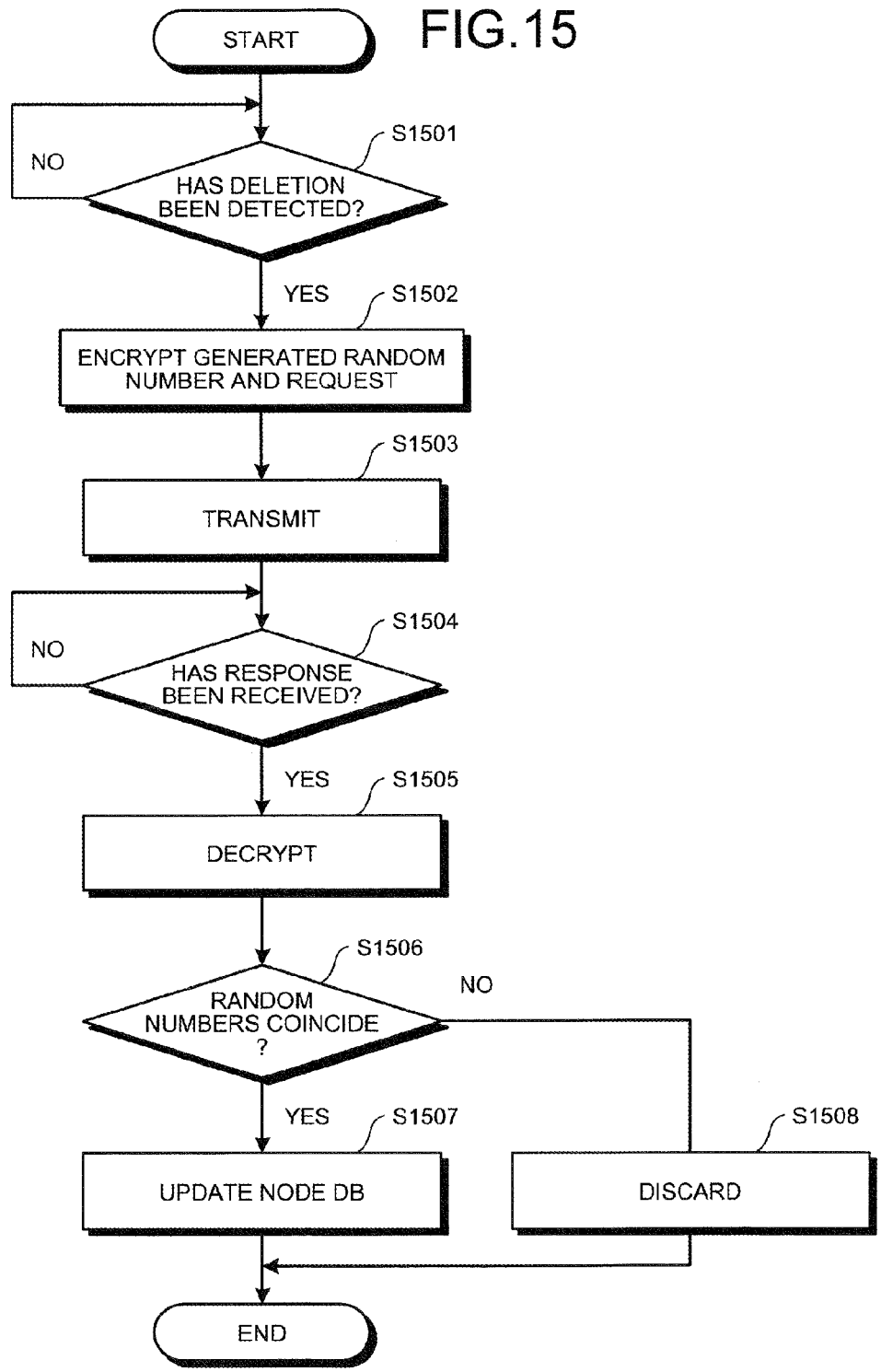
FIG. 15 is a flowchart of details of a transmission counter value updating process in the example of FIGS. 13 and 14.

FIG. 15 is a flowchart of details of the transmission counter value updating process in the example of FIGS. 13 and 14. The CPU 301 first detects whether the transmission counter value has been deleted (step S1501). If the transmission counter value has not been deleted (step S1501: NO), the CPU 301 returns to step S1501.

On the contrary, if the transmission counter value has been deleted (step S1501: YES), the CPU 301 generates a random number, encrypts the generated random number and the request for the reception counter value using the fixed key FK, and generates an encrypted packet EP (step S1502). The CPU 301 then transmits the created encrypted packet EP to a neighboring node (step S1503).

The CPU 301 determines whether a response from the neighboring node has been received (step S1504). If no response has been received (step S1504: NO), the CPU 301 returns to step S1504.

On the contrary, if a response has been received (step S1504: YES), the CPU 301 decrypts, using the fixed key FK, the response encrypted packet EP (step S1505). The CPU 301 then determines whether the random number in the decrypted packet P coincides with the random number generated at step S1502 (step S1506).

If the random numbers coincide (step S1506: YES), the CPU 301 updates the transmission counter value in the node DB 110 of the node, to the reception counter value in the packet P (step S1507) to terminate the transmission counter value updating process.

If the random numbers do not coincide (step S1506: NO), the CPU 301 discards the received encrypted packet EP as being an invalid packet (step S1508) to terminate the transmission counter updating process.

Accordingly, the node N can update the transmission counter value even if the transmission counter value is deleted and can return to the ad hoc network A. Due to the request packet being encrypted using the fixed key FK, it is possible to prevent an attacker having no fixed key FK from analyzing the request packet.

Further, the node N determines for each communication, whether the communication is a proper response by including in the request packet, a random number generated for each communication with a neighboring node. Since the random number is different for each communication, even if the attacker attempts to utilize for a resend attack, an encrypted packet EP returned from a neighboring node during the last communication by disguising the encrypted packet EP as a response to the current request packet, the node N can determine the encrypted packet EP as being an invalid packet, ensuring communication quality.

By storing the used random number, even if the attacker attempts to utilize for a resend attack before the next communication, an encrypted packet EP returned from a neighboring node in the current communication, the node N can determine the encrypted packet EP as being an invalid packet, ensuring communication quality. In this manner, by using the sum of the transmission counts instead of the time information, the resend attack can be detected simply and efficiently to achieve a reduction in the communication load.

Figure 16:
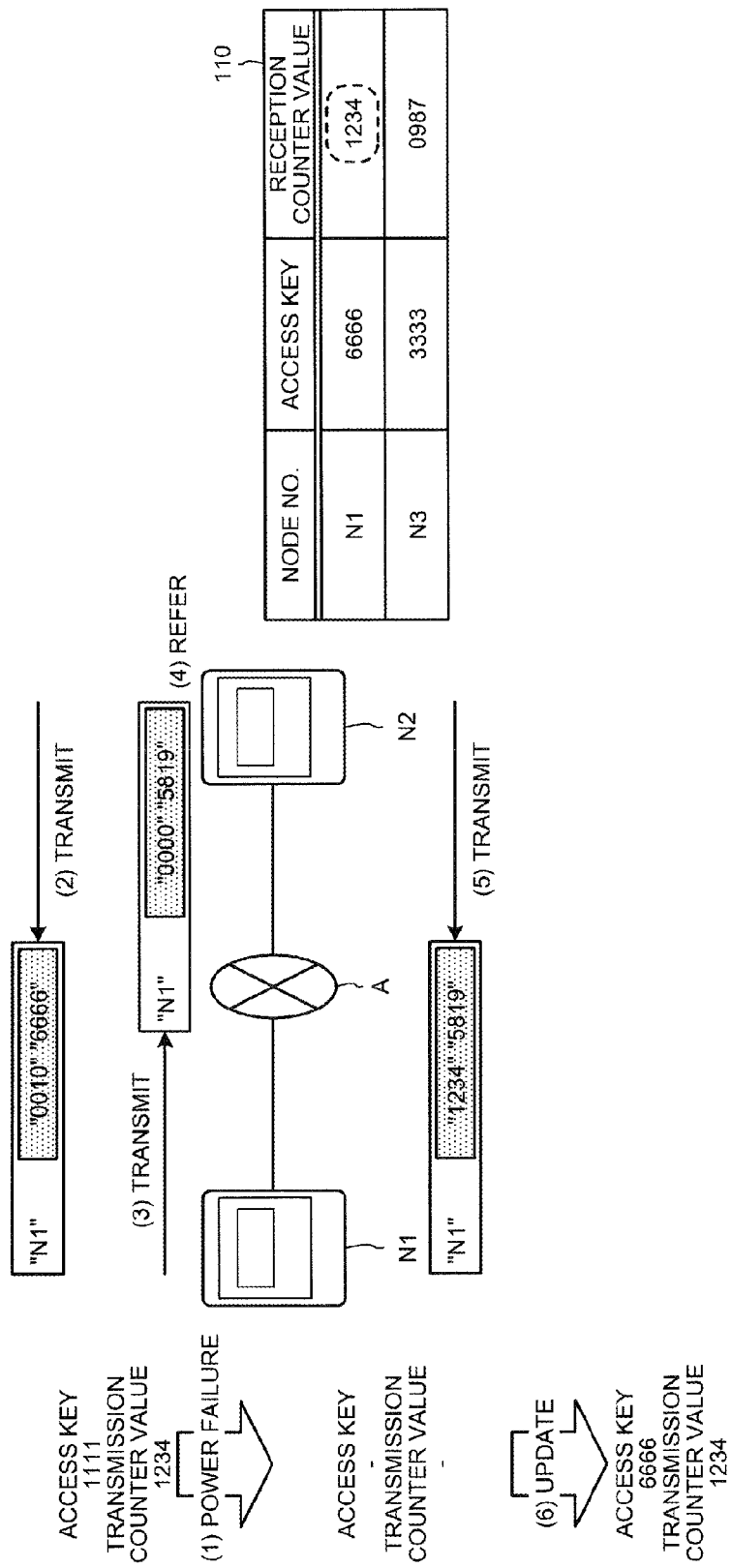
FIG. 16 is an explanatory view of an operation example 2 when the transmission counter value of the node is deleted.

FIG. 16 is an explanatory view of an operation example 2 when the transmission counter value of a node is deleted. In FIG. 16, (1) a power failure is assumed to occur in the node N1. As a result, the transmission counter value and the access key AK retained by the node N1 are assumed to be deleted. In this case, the node N1 stands by until the access key AK is transmitted from the N2, a neighboring node.

(2) The node N2 generates an access key AK at given intervals and transmits the generated access key AK to a neighboring node. Here, the node N1 is assumed to receive an access key AK "6666" transmitted from the node N2.

(3) Subsequently, the node N1 generates a random number "5819" and creates a packet P that includes the random number "5819" and a specific transmission counter value "0000" indicating a request for the reception counter value of the node N1 (the reception counter value being retained in the node DB 110 of the node N2), and encrypts the packet using the access key AK "6666". The node N1 then performs uni-hop communication with the node N2 of the encrypted packet EP and the node number "N1". The node number "N1" is included in an unencrypted portion such as the header. Similarly, in the following description, the node number is included in an unencrypted portion.

The node N2 receiving an encrypted packet EP from the node N1, identifies from the node number, the node N1 as the sender of the encrypted packet EP. The node N2 then decrypts the encrypted packet EP using the access key AK "6666" and acquires the transmission counter value "0000" and the random number "5819".

(4) Since the transmission counter value "0000" is a specific counter value indicating a request for the reception counter value, the node N2 refers to the node DB 110 and creates a packet that includes the reception counter value "1234" and the random number "5819", and encrypts the encrypted packet EP using the fixed key FK. (5) The node N2 then performs uni-hop communication with the node N1 of the encrypted packet EP together with the node number "N2".

(6) The node N1 receiving the encrypted packet EP from the node N2, decrypts the encrypted packet EP using the fixed key FK and acquires the reception counter value "1234" and the random number "5819" of the node N2. The node N1 verifies that the random number coincides with the random number transmitted from the node N1 and, if determined to be a proper packet, updates the transmission counter value of the node N1 to the reception counter value "1234" of the node N2. When transmitting a request packet to plural nodes N, the greatest value among the reception counter values of each node is used as the transmission counter value of the node.

Figure 17:
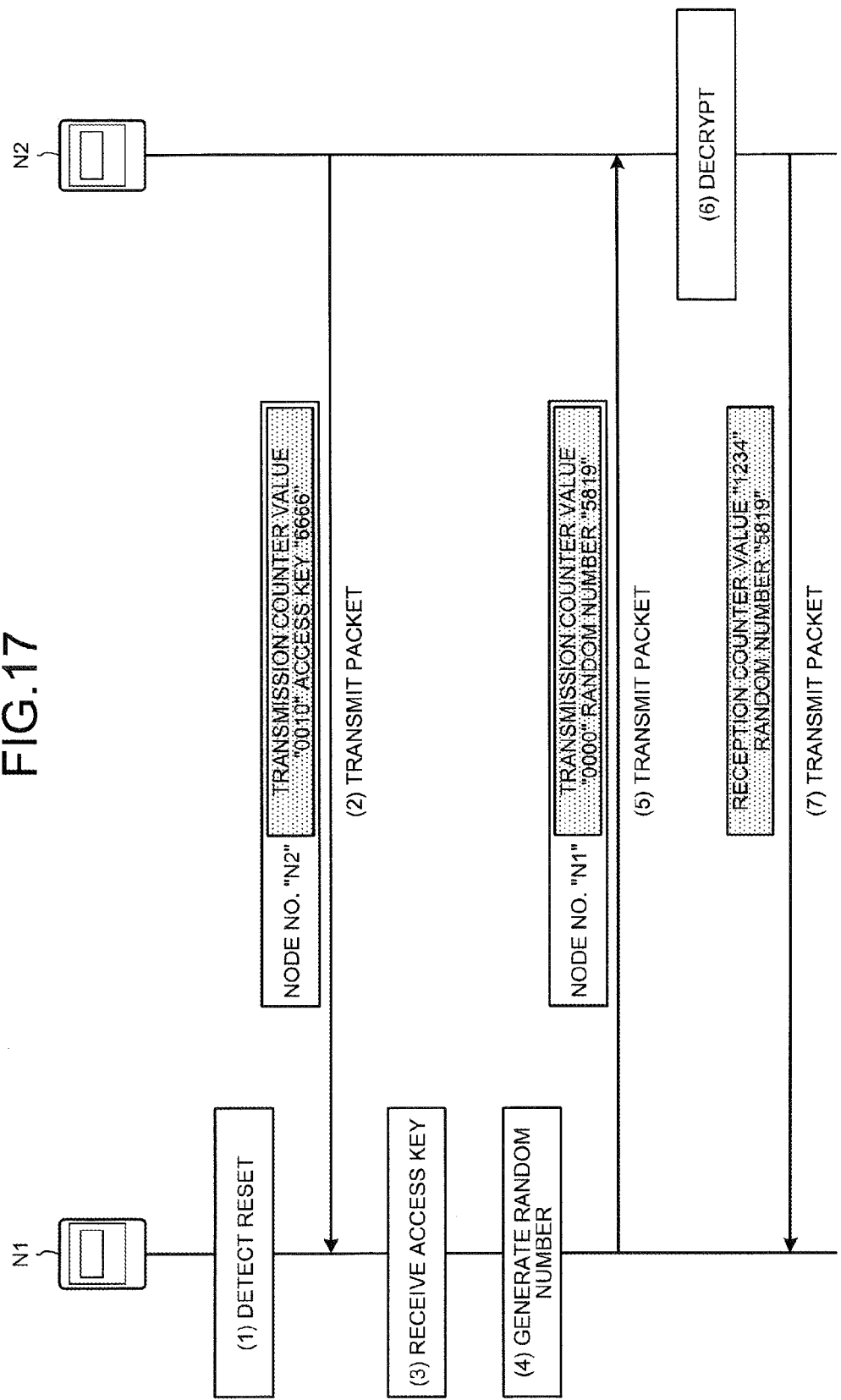
FIG. 17 is a sequence diagram of the operation example 2 of FIG. 16 when the transmission counter value of the node is deleted.

FIG. 17 is a sequence diagram of the operation example 2 of FIG. 16 when the transmission counter value of the node is deleted. In FIG. 17, (1) the node N1 sensing the deletion of the transmission counter value stands by until an access key AK is transmitted from the node N2, a neighboring node. (2) The node N2 generates the access key AK at given intervals and transmits the generated access key AK to a neighboring node. Here, the node N2 transmits an access key AK "6666" to a neighboring node. (3) The node N1 receives the access key AK "6666" transmitted from the node N2.

(4) Next, the node N1 generates a random number "5819" and creates a packet that includes the random number "5819" and a specific transmission counter value "0000" indicating a request for the reception counter value for the node N1 retained in the node DB 110 of the node N2, and encrypts the packet using the access key AK "6666". (5) The node N1 performs uni-hop communication, with the node N2, of the encrypted packet EP together with the node number "N1".

The node N2 receiving the encrypted packet EP, recognizes the node N1 as the sender of the packet from the node number and decrypts the encrypted packet EP using the fixed key FK to acquire the transmission counter value "0000" and the random number "5819". The node N2 refers to the node DB 110 and, if the reception counter value of the node N1 is not retained therein, discards the encrypted packet EP.

(7) If the reception counter value is retained in the node DB 110, the node N2 encrypts the reception counter value "1234" and the random number "5819" using the fixed key FK and sends the encrypted reception counter value "1234" and random number "5819" to the node N1. The node N1 receiving the encrypted packet EP from the node N2, decrypts the encrypted packet EP using the fixed key FK and acquires the reception counter value "1234" and the random number "5819".

If the acquired random number coincides with the random number transmitted from the node N1, the node N1 updates the transmission counter value of the node N1, to the reception counter value in the node N2. If the acquired random number does not coincide, the node N1 discards the received encrypted packet EP as being an invalid packet. Here, the random number is used for detecting the transmitting of an invalid packet from an attacker having no fixed key FK.

Figure 18:
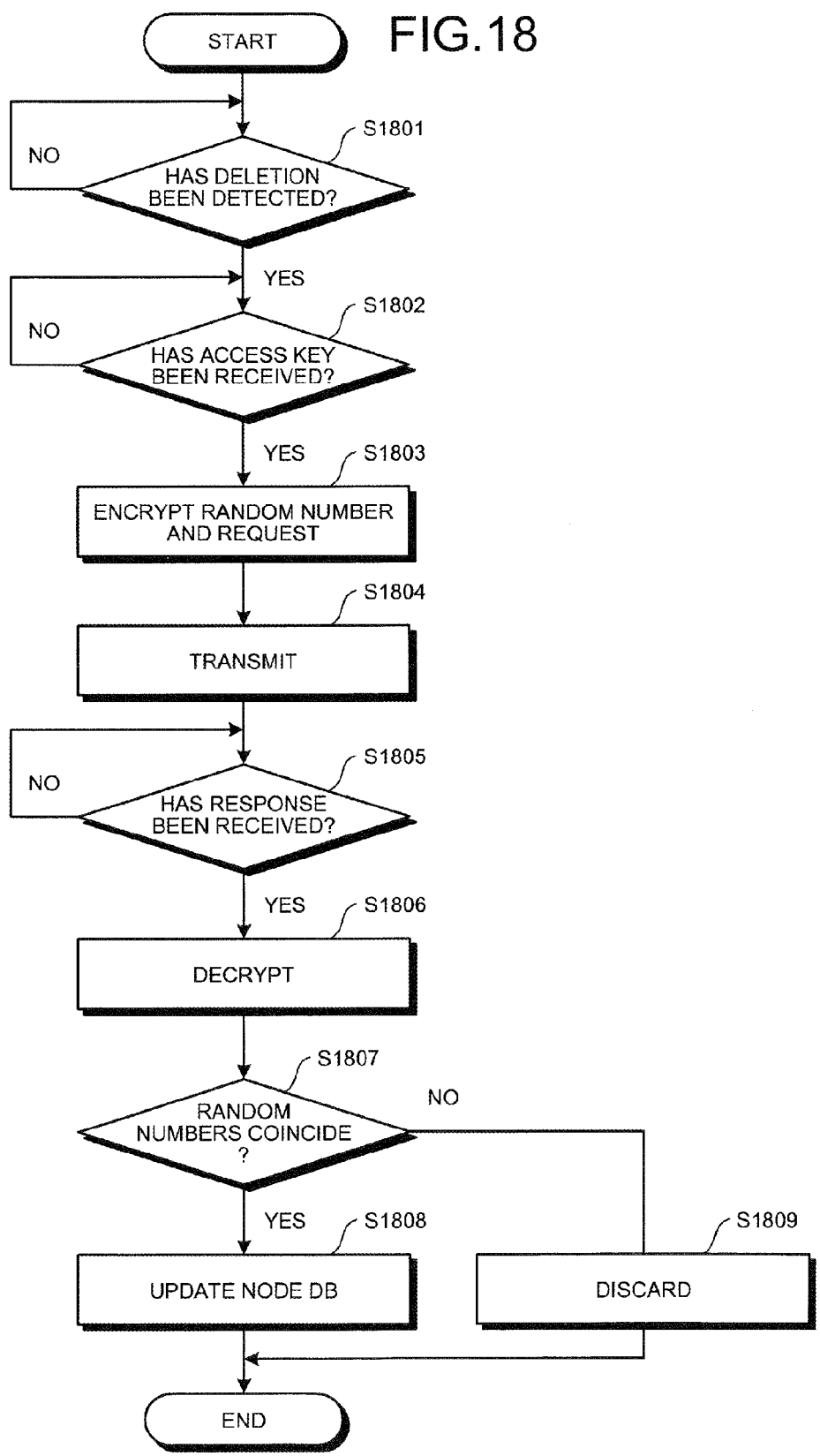
FIG. 18 is a flowchart of details of the transmission counter value updating process in the example of FIGS. 16 and 17.

FIG. 18 is a flowchart of details of the transmission counter value updating process in the example of FIGS. 16 and 17. The CPU 301 first detects whether the transmission counter value has been deleted (step S1801). If the transmission counter value has not been deleted (step S1501: NO), the CPU 301 returns to step S1801.

On the other hand, if the transmission counter value has been deleted (step S1801: YES), the CPU 301 detects whether the access key AK has been received (step S1802). If the access key AK has not been received (step S1802: NO), the CPU 301 returns to step S1802.

On the other hand, if the access key AK has been received (step S1802: YES), the CPU 301 generates a random number and using the access key AK, encrypts the generated random number and a request for the reception counter value to create an encrypted packet EP (step S1803). The CPU 301 then transmits the created encrypted packet EP to a neighboring node (step S1804).

The CPU 301 determines whether a response from the neighboring node has been received (step S1805). If no response has been received (step S1805: NO), the CPU 301 returns to step S1805.

On the contrary, if a response has been received (step S1805: YES), the CPU 301 decrypts, using the fixed key FK, the response encrypted packet EP (step S1806). The CPU 301 then determines whether the random number in the decrypted packet P coincides with the random number generated at step S1803 (step S1807).

If the random numbers coincide (step S1807: YES), the CPU 301 updates the transmission counter value in the node DB 110 of the node, to the reception counter value in the packet P (step S1808) to terminate the transmission counter value updating process.

If the random numbers do not coincide (step S1807: NO), the CPU 301 discards the received encrypted packet EP as being an invalid packet (step S1809) to terminate the transmission counter updating process.

Accordingly, the node N can update the transmission counter value even when the transmission counter value is deleted and can return to the ad hoc network A. Since the access key AK transmitted from a neighboring node is encrypted using the fixed key FK, an attacker having no fixed key FK cannot acquire the access key AK. Further, since the request packet is encrypted using the access key AK, analysis of the request packet by the attacker can be prevented.

Further, the node N causes a request packet to have a random number generated for each communication with a neighboring node, enabling for each communication, determination of whether a proper packet is received in response. Since the random number is different for each communication, even if the attacker attempts to utilize for a resend attack, an encrypted packet EP returned from a neighboring node during the last communication by disguising the encrypted packet EP to be a response to the current request packet, the node N can determine the encrypted packet EP as being an invalid packet, ensuring communication quality. By storing the used random number, even if the attacker attempts to utilize for a resend attack before the next communication, an encrypted packet EP returned from a neighboring node in the current communication, the node N can determine the encrypted packet EP as being an invalid packet, ensuring communication quality.

Furthermore, by virtue of the updating of the access key at given intervals, even if the attacker intercepts the encrypted packet EP, the attacker cannot perform the resend attack after the elapse of a certain period of time. In this manner, by using the sum of the transmission counts instead of the time information, the resend attack can simply and efficiently be detected to achieve a reduction in the communication load.

A second example will be described. Although in the first example the transmission counter value is the sum of the transmission counts of encrypted packets EP and is retained by the transmitting nodes, in the second example, the transmission counter value is retained for each destination node. By storing a transmission counter value for each destination node, the transmission counter value in the encrypted packet EP received by the destination node is certainly incremented.

Thus, even if the attacker tampers with the transmission counter value of a intercepted encrypted EP and alters the transmission counter value into a larger value, the node N can determine the resend attack with greater accuracy. The node N cannot erroneously update in the node DB 110, the reception counter value to the tampered transmission counter value. In this manner, by retaining a transmission counter value for each destination node instead of using time information, a resend attack can simply and efficiently be detected to achieve a reduction in the communication load.

Figure 19:
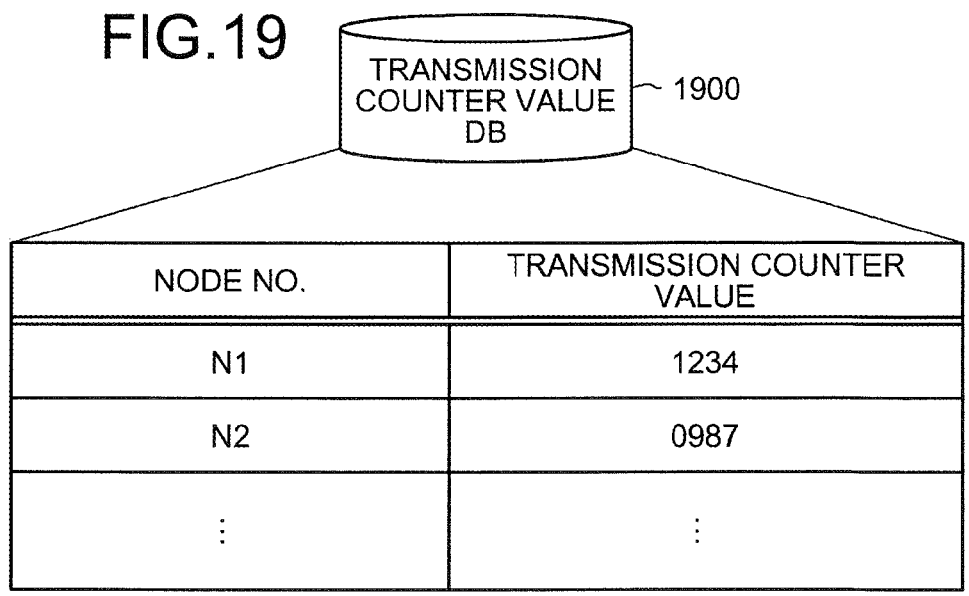
FIG. 19 is an explanatory view of an example of the contents of a transmission counter value DB 1900.

FIG. 19 is an explanatory view of an example of the contents of a transmission counter value DB 1900. As depicted in FIG. 19, the transmission counter value DB 1900 has a transmission counter value field corresponding to a node number field. The node DB 110 forms a record when the node N transmits an encrypted packet EP.

The node number field stores identifiers (N1 to Nm) of the nodes in the ad hoc network A. The transmission counter value field stores the count of transmissions of the encrypted packet EP to the nodes having respective node numbers.

Figure 20:
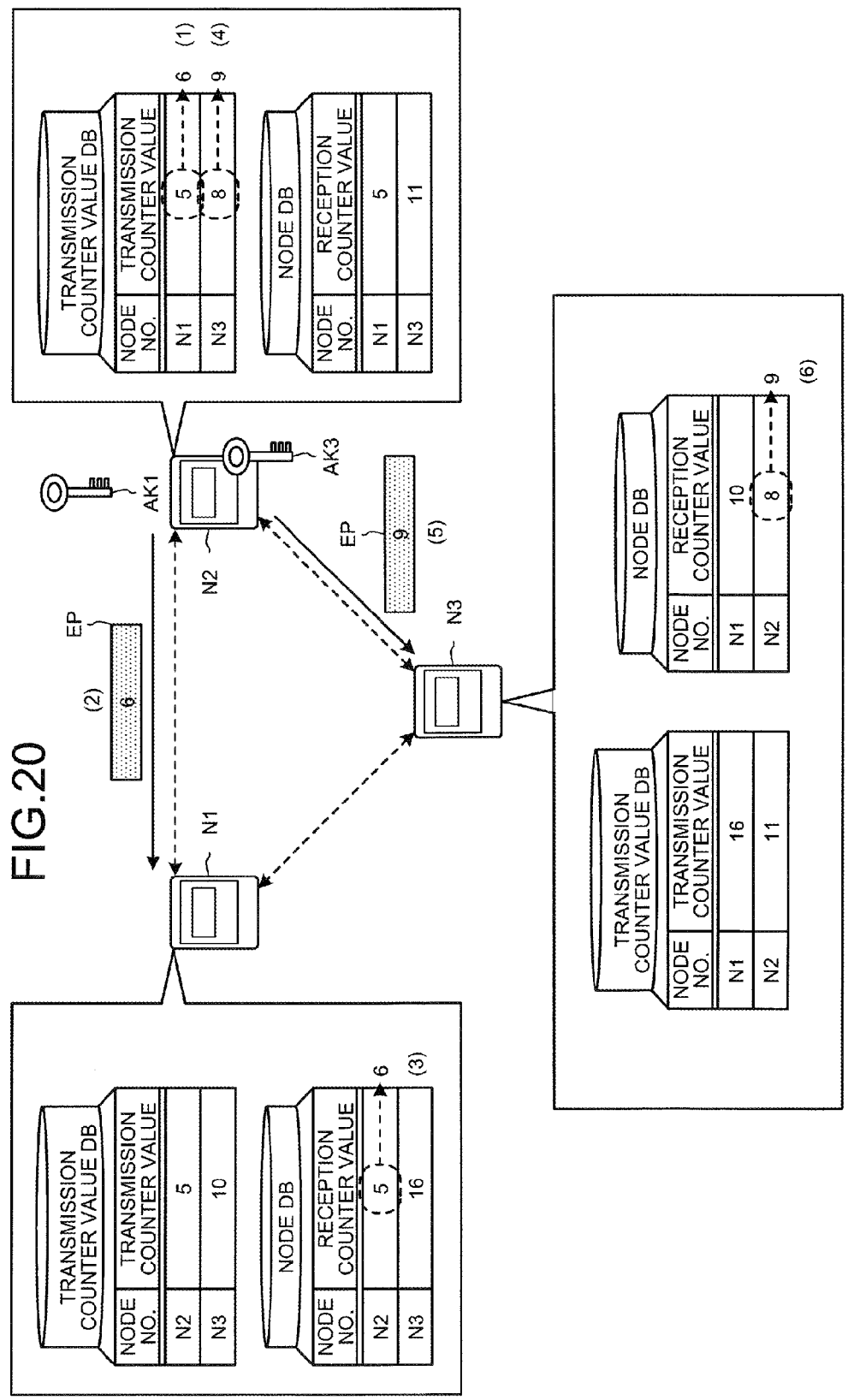
FIG. 20 is an explanatory view of the encrypted communication that uses the access key AK in the network system 200 according to the second example.

With reference to FIG. 20, an example of encrypted communication according to the second example will be described.

FIG. 20 is an explanatory view of the encrypted communication that uses the access key AK in the network system 200 according to the second example. In FIG. 20, the ad hoc network A includes the nodes N1, N2, and N3.

(1) When transmitting an encrypted packet EP at a sixth transmission to the node N1, the node N2 updates the transmission counter value for the node N1, the transmission counter value being stored in the storage device of the node N2 from "5" to "6". Then, (2) the node N2 transmits to the node N1, the encrypted packet EP encrypted from a packet P that is to be transmitted and includes the updated transmission counter value "6".

(3) The node N1 receiving the encrypted packet EP, extracts the sender node number and the transmission counter value from the packet P decrypted from the encrypted packet EP. The node N1 compares the transmission counter value "6" extracted from the decrypted packet P and the reception counter value "5" of the node N2 retained in the node DB 110 of the node N1. In this case, it can be seen that the node N1 has received an encrypted packet EP transmitted at a fifth transmission from the node N2 to the node N1 in the past and that the encrypted packet EP received this time is a packet transmitted at a sixth transmission from the node N2 to the node N1.

Accordingly, the received encrypted packet EP can be determined to be a proper encrypted packet EP. The node N1 stores to the node DB 110 of the node N1, the transmission counter value "6" as a new reception counter value associated with the node N2.

(4) When transmitting an encrypted packet EP at a ninth transmission to the node N3, the node N2 updates the transmission counter value for the node N3 from "8" to "9", the transmission counter value being stored in the storage device of the node N2. Then, (5) the node N2 transmits to the node N3, an encrypted packet EP encrypted from a packet P that is to be transmitted and includes the updated transmission counter value "9".

(6) The node N3 receiving the encrypted packet EP, extracts the sender node number and the transmission counter value from the packet P decrypted from the encrypted packet EP. The node N3 compares the transmission counter value "9" extracted from the decrypted packet P and the reception counter value "8" of the node N2 retained in the node DB 110 of the node N3. In this case, it can be seen that the node N3 has received an encrypted packet EP transmitted at an eighth transmission from the node N2 to the node N3 in the past and that the encrypted packet EP received this time is a packet transmitted at a ninth transmission from the node N2 to the node N3.

Accordingly, the received encrypted packet EP can be determined to be a proper encrypted packet EP. The node N3 stores to the node DB 110 of the node N3, the transmission counter value "9" as a new reception counter value associated with the node N2. In this manner, the transmitting node N counts the number of transmissions for each destination node and updates the transmission counter value for the transmission of an encrypted packet EP. This enables a transmission counter value to be managed for each destination node.

In the second example, the packet transmission process, the packet reception process, and the transmission counter value updating process in the encrypted communication are similar to the processes depicted in FIGS. 11, 12, 15 and 18 and therefore, will not again be described hereinafter.

As set forth hereinabove, according to the communication method, the node, and the network system of the embodiment, the node N transmitting an encrypted packet EP causes the encrypted packet EP to have the transmission counter value. The receiving node N detects an invalid packet by comparing the transmission counter value of the encrypted packet EP received the last time, with the transmission counter value of the encrypted packet EP received this time.

Thus, the node N can discard only an invalid packet transmitted from the node Nc of an attacker without discarding a proper encrypted packet EP transmitted from a neighboring node, thereby enabling a resend attack to be prevented while guaranteeing communication security. Since invalid packets are discarded, the node N need not perform processes based on the contents of invalid packets, thereby achieving a reduction in the processing burden on the node N.

Since an invalid packet can be determined without the need for the time synchronization, the communication load caused by the time synchronizing packet does not occur. Since the time synchronization is unnecessary, an invalid packet can be determined even if a gateway transmitting the time synchronizing packet is not present in the ad hoc network A.

Further, when the transmission counter value is deleted, an early return to the ad hoc network A is feasible by transmitting a request packet for the reception counter value retained by the neighboring node. At this time, a request packet resend attack can be prevented by encrypting the request packet using the access key AK immediately when the access key AK arrives. The encrypted packet EP returned from the neighboring node and the invalid packet can be determined by causing the request packet to have the random number.

According to one aspect of the embodiments, a resend attack can be detected simply and efficiently to thereby achieve a reduction in the communication load.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication method executed by a node in an ad hoc network having a plurality of nodes, the communication method comprising:
    receiving from a neighboring node of the node in the ad hoc network, a first packet that includes a sender address of the neighboring node and a first packet transmission count of packet transmissions from the neighboring node;
    extracting the first packet transmission count from the first packet;
    receiving from the neighboring node and after reception of the first packet, a second packet that includes a sender address identical to the sender address included in the first packet and a second packet transmission count of packet transmissions from the neighboring node;
    extracting the second packet transmission count from the second packet;
    determining which one of the first packet and the second packet was transmitted before the other by the neighboring node, based on the first packet transmission count and the second packet transmission count; and
    discarding the second packet upon determining the second packet was transmitted before the first packet by the neighboring node.

2. A network system comprising:
    a communication device in an ad hoc network having a plurality of communication devices and a neighboring communication device of the communication device in the ad hoc network, wherein the communication device includes:
        a processor configured to:
            detect an event of packet transmission to a neighboring communication device of the communication device in the ad hoc network,
            update upon detecting the event of packet transmission, a first packet transmission count of packet transmissions from the communication device, the first packet transmission count being retained in a storage device of the communication device and updated to a value obtained by adding 1 to the first packet transmission count, and
            transmit to the neighboring communication device, a first packet that includes a sender address of the communication device and the updated first packet transmission count; and the neighboring communication device includes:
a processor configured to:
receive the first packet transmitted from the communication device,
extract the first packet transmission count from the received first packet,
receive after receiving the first packet, a second packet that includes a sender address identical to the sender address included in the first packet and a second packet transmission count of transmissions from the communication device,
extract the second packet transmission count from the received second packet,
determine which one of the first packet and the second packet was transmitted before the other by the communication device, based on the extracted first packet transmission count and on the extracted second packet transmission count, and
discard the second packet upon determining the second packet was transmitted before the first packet by the communication device.

3. The network system according to claim 2, wherein the processor of the communication device is configured to further execute:
sensing a deletion of the packet transmission count retained in the storage device of the communication device;
notifying upon sensing the deletion of the packet transmission count, the neighboring communication device of a request packet requesting the packet transmission count that is for the communication device and retained in the storage device of the neighboring communication device;
receiving from the neighboring communication device in response to the request packet, a response packet that includes the packet transmission count for the communication device;
extracting from the response packet, the packet transmission count for the communication device; and
storing to the storage device of the communication device, the extracted packet transmission count for the communication device.

4. The network system according to claim 3, wherein the processor of the communication device is configured to further execute:
encrypting the request packet using a common key that the communication devices in the ad hoc network have; and
decrypting the response packet by using the common key, the response packet having been encrypted by the neighboring communication device using the common key, wherein
the notifying includes notifying the neighboring communication device of the encrypted request packet,
the receiving includes receiving from the neighboring communication device, the response packet encrypted using the common key,
the decrypting includes decrypting the response packet from the encrypted response packet, and
the extracting includes extracting from the decrypted response packet, the packet transmission count for the communication device.

5. The network system according to claim 3, wherein
the notifying includes notifying the neighboring communication device of the request packet that is encrypted and includes first identification information unique to the communication device,
the receiving includes receiving from the neighboring communication device, the response packet that is encrypted using a common key and includes second identification information,
the extracting includes extracting the second identification information from the response packet decrypted from the encrypted response packet received, and
the storing includes storing to the storage device of the communication device, the extracted packet transmission count for the communication device, when the first identification information coincides with the extracted second identification information.

6. The network system according to claim 5, wherein the processor of the communication device is configured to further execute
generating a random number as the first identification information.

7. The network system according to claim 3, wherein the processor of the communication device is configured to further execute:
receiving from the neighboring communication device and after sensing the deletion, a second common key that the neighboring communication device has and that is encrypted using a first common key that the communication devices in the ad hoc network have;
decrypting the second common key from the encrypted second common key, by using the first common key;
encrypting the request packet using the decrypted second common key; and
decrypting, by using the decrypted second common key, the response packet encrypted using the second common key by the neighboring communication device, wherein
the notifying includes notifying the neighboring communication device of the encrypted request packet,
the receiving includes receiving from the neighboring communication device, the response packet encrypted using the second common key,
the decrypting includes decrypting the response packet from the encrypted response packet, and
the extracting includes extracting from the decrypted response packet, the packet transmission count for the communication device.

8. The network system according to claim 3, wherein
the notifying includes notifying the neighboring communication device of the request packet that is encrypted and includes first identification information unique to the communication device,
the receiving includes receiving from the neighboring communication device, the response packet that is encrypted using the second common key and includes second identification information, wherein
the extracting includes extracting the second identification information from the response packet decrypted from the encrypted response packet received, and
the storing includes storing to the storage device of the communication device, the extracted packet transmission count for the communication device, when the first identification information coincides with the extracted second identification information.

9. The network system according to claim 8, wherein the processor of the communication device is configured to further execute
generating a random number as the first identification information.

* * * * *